US011996049B2

(12) United States Patent
No et al.

(10) Patent No.: US 11,996,049 B2
(45) Date of Patent: May 28, 2024

(54) PIXEL AND DISPLAY APPARATUS INCLUDING THE SAME

(71) Applicant: Samsung Display Co., Ltd., Yongin-si (KR)

(72) Inventors: Sangyong No, Yongin-si (KR); Gichang Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/311,398

(22) Filed: May 3, 2023

(65) Prior Publication Data

US 2023/0368736 A1 Nov. 16, 2023

(30) Foreign Application Priority Data

May 16, 2022 (KR) ........................ 10-2022-0059837
Oct. 18, 2022 (KR) ........................ 10-2022-0134465

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2310/0202* (2013.01); *G09G 2310/0205* (2013.01); *G09G 2310/0262* (2013.01); *G09G 2310/08* (2013.01); *G09G 2320/0257* (2013.01); *G09G 2330/021* (2013.01)

(58) Field of Classification Search
CPC ......... G09G 2300/0819; G09G 3/3233; G09G 2300/0852; G09G 2310/0202; G09G 2310/0205; G09G 2310/0262; G09G 2310/08
See application file for complete search history.

(56) References Cited

U.S. PATENT DOCUMENTS

| | | | |
|---|---|---|---|
| 8,982,017 | B2 | 3/2015 | Lee et al. |
| 2014/0192037 | A1 | 7/2014 | Chung |
| 2022/0301484 | A1 | 9/2022 | In et al. |
| 2023/0042966 | A1 | 2/2023 | Huangfu et al. |

FOREIGN PATENT DOCUMENTS

| | | |
|---|---|---|
| KR | 10-1859474 | 5/2018 |
| KR | 10-2020-0050204 | 5/2020 |
| KR | 10-2021-0054114 | 5/2021 |
| KR | 10-2021-0055146 | 5/2021 |
| KR | 10-2021-0083918 | 7/2021 |
| WO | 2021/258915 | 12/2021 |

OTHER PUBLICATIONS

Extended European Search Report for European Application No. 23173370.0, dated Sep. 8, 2023.

*Primary Examiner* — Abbas I Abdulselam
(74) *Attorney, Agent, or Firm* — KILE PARK REED & HOUTTEMAN PLLC

(57) ABSTRACT

A pixel including a control transistor electrically connected between a gate of a switching transistor or another switching transistor and a node, and that controls a bias state of a driving transistor according to a voltage of a first gate signal for controlling turn-on of the switching transistor and a voltage of a second gate signal for controlling turn-on of the other switching transistor.

20 Claims, 31 Drawing Sheets

PIXEL AND DISPLAY APPARATUS INCLUDING THE SAME

CROSS-REFERENCE TO RELATED APPLICATION(S)

This application is based on and claims priority under 35 U.S.C. § 119 to Korean Patent Application Nos. 10-2022-0059837, filed on May 16, 2022 in the Korean Intellectual Property Office, and 10-2022-0134465, filed on Oct. 18, 2022 in the Korean Intellectual Property Office, the entire contents of which are incorporated herein by reference.

BACKGROUND

1. Technical Field

One or more embodiments relate to a pixel and a display apparatus including the same.

2. Description of the Related Art

An organic light-emitting display apparatus includes a display element whose luminance may be changed by a current, for example, an organic light-emitting diode. A pixel of the organic light-emitting display apparatus may include a display element, a driving transistor for controlling the amount of current supplied to the display element according to a voltage between a gate and a source, and a switching transistor for transmitting a data signal for controlling the luminance of the display element to the driving transistor.

SUMMARY

One or more embodiments include a display apparatus in which an afterimage may be minimized while being driven at multiple frequencies. The technical aspects of the disclosure are not limited to the above-mentioned technical aspects, and other technical aspects that are not mentioned will be clearly understood by a person skilled in the art from the description of the disclosure.

Additional aspects will be set forth in part in the description which follows and, in part, will be apparent from the description, or may be learned by practice of the embodiments of the disclosure.

According to one or more embodiments, a pixel may include a light-emitting device, a driving transistor electrically connected between a driving voltage line and the light-emitting device and that controls a driving current supplied to the light-emitting device, a first switching transistor electrically connected between a data line and a first node to which a gate of the driving transistor is electrically connected, a second switching transistor electrically connected between the driving voltage line and a second node to which a first terminal of the driving transistor is electrically connected, a third switching transistor electrically connected between a third node electrically connected to which a second terminal of the driving transistor is electrically connected and the light-emitting device, and a control transistor electrically connected between a gate of the second switching transistor or a gate of the third switching transistor and the second node. The control transistor may control a bias state of the driving transistor in response to a voltage of a first gate signal for controlling turn-on of the second switching transistor and a voltage of a second gate signal for controlling turn-on of the third switching transistor.

The control transistor may be electrically connected between a gate of the second switching transistor and the second node and may include a gate electrically connected to the second node, and the control transistor may control the driving transistor in an on-bias state by supplying a first level voltage of the first gate signal to the second node while a first level voltage of the first gate signal for turning off the second switching transistor and the first level voltage of the second gate signal for turning off the third switching transistor overlap each other.

The pixel may further include a first capacitor and a second capacitor serially connected between the first node and the driving voltage line, a fourth switching transistor electrically connected between the third node and a fourth node, a fifth switching transistor electrically connected between the fourth node and an initialization voltage line, a sixth switching transistor electrically connected between the first node and the fourth node, a seventh switching transistor electrically connected between a fifth node to which the first capacitor and the second capacitor are electrically connected and the first switching transistor, an eighth switching transistor electrically connected between a sixth node to which the first switching transistor and the eleventh switching transistor are electrically connected and a reference voltage line, and a ninth switching transistor electrically connected between a pixel electrode of the light-emitting device and the initialization voltage line.

In case that a third gate signal applied to gates of the sixth switching transistor and the eleventh switching transistor is the first level voltage, the sixth switching transistor and the seventh switching transistor may be turned on.

In case that a fourth gate signal is simultaneously applied to a gate of the first switching transistor and a gate of the ninth switching transistor and the fourth gate signal is a second level voltage, the first switching transistor and the ninth switching transistor may be turned on.

The control transistor may be electrically connected between a gate of the third switching transistor and the second node, may include a gate electrically connected to a gate of the second switching transistor, and in case that the first gate signal is a first level voltage, the second switching transistor may be turned off, and the control transistor may be turned on.

The control transistor may control the driving transistor in an on-bias state by supplying a first level voltage of the second gate signal to the second node while a first level voltage of the first gate signal for turning off the second switching transistor and the first level voltage of the second gate signal for turning off the third switching transistor overlap each other.

The control transistor may control the driving transistor in an off-bias state by supplying a second level voltage of the second gate signal to the second node while a first level voltage of the first gate signal for turning off the second switching transistor and the second level voltage of the second gate signal for turning off the third switching transistor overlap each other.

The pixel may further include a first capacitor and a second capacitor serially connected between the first node and the driving voltage line, a fourth switching transistor electrically connected between the third node and a fourth node, a fifth switching transistor electrically connected between the fourth node and an initialization voltage line, a sixth switching transistor electrically connected between the first node and the fourth node, a seventh switching transistor electrically connected between a fifth node to which the first capacitor and the second capacitor are electrically connected and the first switching transistor, an eighth switching transistor electrically connected between a sixth node to which the first switching transistor and the eleventh switching transistor are electrically connected and a reference voltage line, and a ninth switching transistor electrically connected between a pixel electrode of the light-emitting device and the initialization voltage line.

In case that the second gate signal is applied to gates of the sixth switching transistor and the seventh switching transistor and the second gate signal is the first level voltage, the sixth switching transistor and the seventh switching transistor may be turned on.

In case that the third gate signal is simultaneously applied to a gate of the first switching transistor and a gate of the ninth switching transistor and the third gate signal is a second level voltage, the first switching transistor and the ninth switching transistor may be turned on.

According to one or more embodiments, a display apparatus may include a pixel unit including a first pixel arranged in a first row, and a second pixel arranged in a second row adjacent to the first row, a gate driving circuit that supplies a gate signal to the first pixel and the second pixel, and a data driving circuit that supplies data signals to the first pixel and the second pixel. Each of the first pixel and the second pixel may include a light-emitting device, a driving transistor electrically connected between a driving voltage line and the light-emitting device and that controls a driving current supplied to the light-emitting device, a first switching transistor electrically connected between a data line and a first node to which a gate of the driving transistor is electrically connected and including a gate electrically connected to a first gate line, a third switching transistor electrically connected between a third node to which a second terminal of the driving transistor is electrically connected and the light-emitting device and comprising a gate electrically connected to a third gate line, and the first pixel and the second pixel share the driving voltage line, and the third gate line, a second switching transistor electrically connected between a second node to which a first terminal of the driving transistor of the first pixel and a first terminal of a driving transistor of the second pixel are electrically connected and the driving voltage line and comprising a gate electrically connected to a second gate line, a control transistor electrically connected between the third gate line and the second node and comprising a gate electrically connected to the third gate line, and the second gate line. The control transistor may control a bias state of the driving transistors of the first pixel and the second pixel according to a voltage level of a second gate signal supplied to the second gate line and a voltage level of a third gate signal supplied to the third gate line.

The control transistor may control the driving transistor in an on-bias state by supplying a first level voltage of the second gate signal to the second node while a first level voltage of the second gate signal for turning off the second switching transistor and the first level voltage of the third gate signal for turning off the third switching transistor overlap each other.

The control transistor may control the driving transistor in an off-bias state by supplying a second level voltage of the third gate signal to the second node while a first level voltage of the second gate signal for turning off the second switching transistor and the second level voltage of the third gate signal for turning off the third switching transistor overlap each other.

Each of the first pixel and the second pixel may further include a first capacitor and a second capacitor that are serially connected between the first node and a reference voltage line, a fourth switching transistor electrically connected between the third node and a fourth node, a fifth switching transistor electrically connected between the fourth node and an initialization voltage line, a sixth switching transistor electrically connected between the first node and the fourth node, a seventh switching transistor electrically connected between a fifth node to which the first capacitor and the second capacitor are electrically connected and the first switching transistor, an eighth switching transistor electrically connected between a sixth node to which the first switching transistor and the seventh switching transistor are electrically connected and the reference voltage line, and a ninth switching transistor electrically connected between a pixel electrode of the light-emitting device and the initialization voltage line.

The third gate signal may be applied to gates of the sixth switching transistor and the seventh switching transistor. In case that the third gate signal is the first level voltage, the sixth switching transistor and the seventh switching transistor may be turned on.

A first gate signal may be simultaneously applied to a gate of the first switching transistor and a gate of the ninth switching transistor. In case that the first gate signal is a second level voltage, the first switching transistor and the ninth switching transistor may be turned on.

The first pixel and the second pixel may share a fourth gate line to which gates of the fourth switching transistor and the eighth switching transistor are electrically connected, a fifth gate line to which a gate of the fifth switching transistor is electrically connected, and the initialization voltage line.

The gate driving circuit may include a first gate driving circuit that supplies the first gate signal of the second level voltage to the first gate line at a first driving frequency corresponding to a maximum driving frequency of the display apparatus, and a second gate driving circuit that supplies the fourth gate signal to the fourth gate line and the fifth gate signal to the fifth gate line at a second driving frequency corresponding to a refresh rate of the display apparatus.

The gate driving circuit may supply the second gate signal to the second gate line and the third gate signal to the third gate line so that the bias state of the driving transistors is controlled at a first driving frequency corresponding to a maximum driving frequency of the display apparatus.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE EMBODIMENTS

Figure 1:
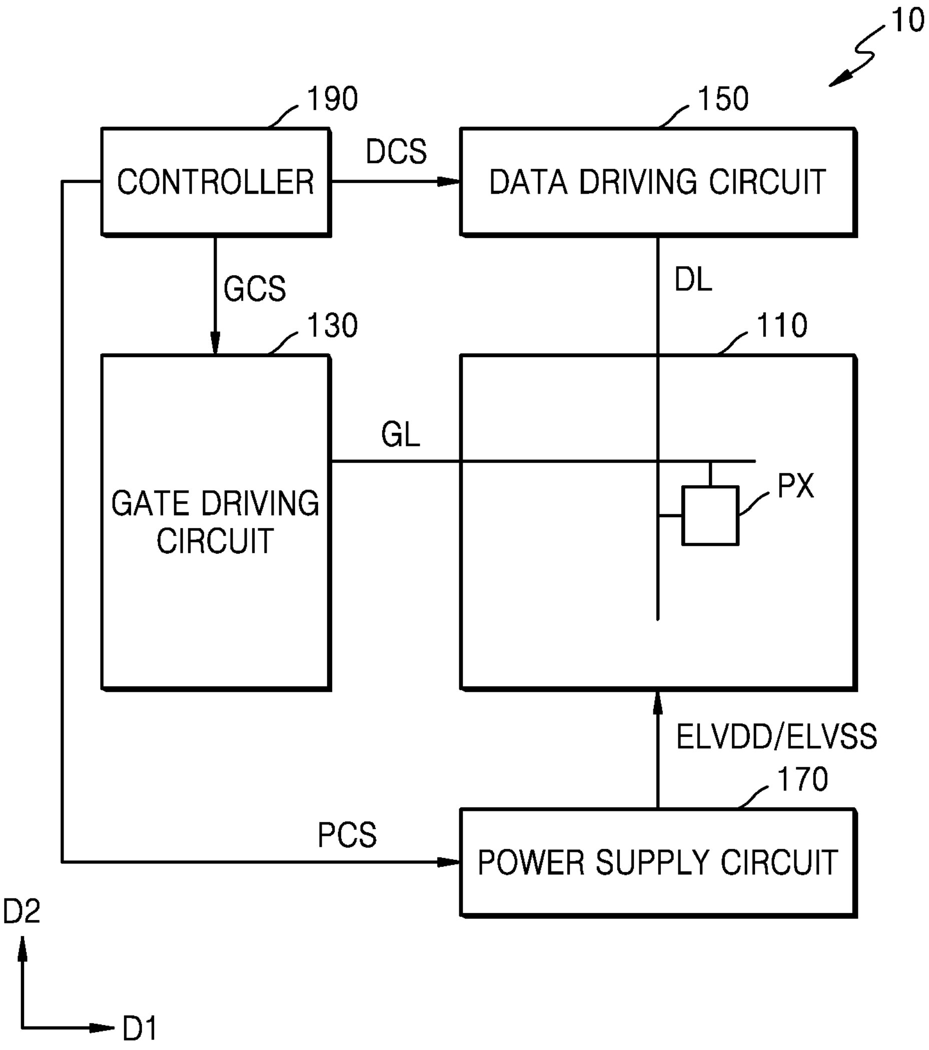
FIG. 1 is a view schematically illustrating a display apparatus according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description.

In the specification and the claims, the term "and/or" is intended to include any combination of the terms "and" and "or" for the purpose of its meaning and interpretation. For example, "A and/or B" may be understood to mean any combination including "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean any combination including "A, B, or A and B."

Since various modifications and various embodiments of the disclosure are possible, specific embodiments are illustrated in the drawings and described in detail in the detailed description. Effects and features of the disclosure, and a method of achieving them will be apparent with reference to embodiments described below in detail in conjunction with the drawings. However, the disclosure is not limited to the embodiments disclosed herein, but may be implemented in a variety of forms.

In the following, the terms such as "first" and "second," etc. were used for the purpose of distinguishing one feature from another feature, and not by way of limitation.

In the following, singular expressions may include plural expressions, unless the context clearly indicates otherwise.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

When a portion such as a layer, a region, an element or the like is described as being "on" other portions, this includes not only when the portion is directly on other elements, but also when other elements are interposed therebetween.

In the drawings, for convenience of explanation, the sizes of elements may be exaggerated or reduced.

In the following, when X and Y are connected to each other, it may include when X and Y are electrically connected to each other, when X and Y are functionally connected to each other, and/or when X and Y are directly connected to each other. Here, X and Y may be objects (for example, devices, elements, circuits, wires, electrodes, terminals, conductive films, layers, etc.). Thus, the disclosure is not limited to a certain connection relationship, for example, the connection relationship indicated in the drawings or the detailed description, and may also include relationships other than the connection relationships indicated in the drawings or the detailed description.

When X and Y are electrically connected to each other, may include, for example, when one or more devices (for example, switches, transistors, capacitive elements, inductors, resistance elements, diodes, etc.) enabling electrical connection of X and Y is connected between X and Y.

In the following embodiments, "ON" used in association with an element state may refer to an activated state of the element, and "OFF" may refer to a deactivated state of the element. "ON" used in connection with a signal received by the element may refer to a signal that activates the element, and "OFF" may refer to a signal that deactivates the element. The element may be activated by a high level voltage or a low level voltage. For example, a P-channel transistor (P-type transistor) may be activated by the low level voltage, and an N-channel transistor (N-type transistor) may be activated by the high level voltage. Thus, it should be understood that the "ON" voltage for the P-type transistor and the N-type transistor may be an opposite (low to high) voltage level.

Figure 2A:
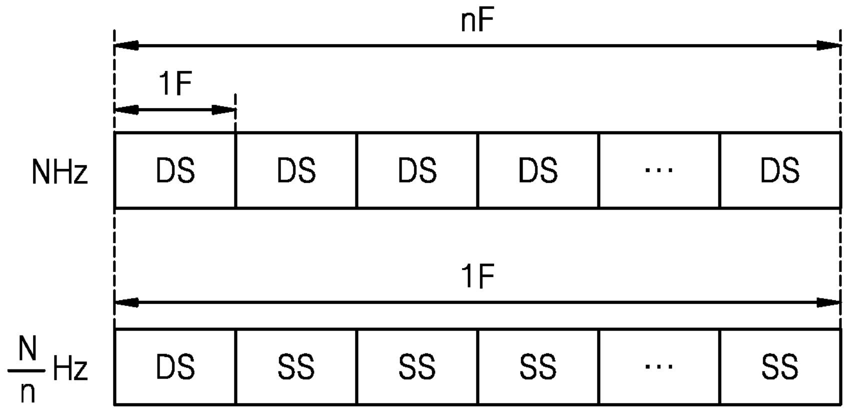
FIGS. 2A through 2C are schematic diagrams for explaining a driving method of a display apparatus according to a driving frequency.
Figure 2B:
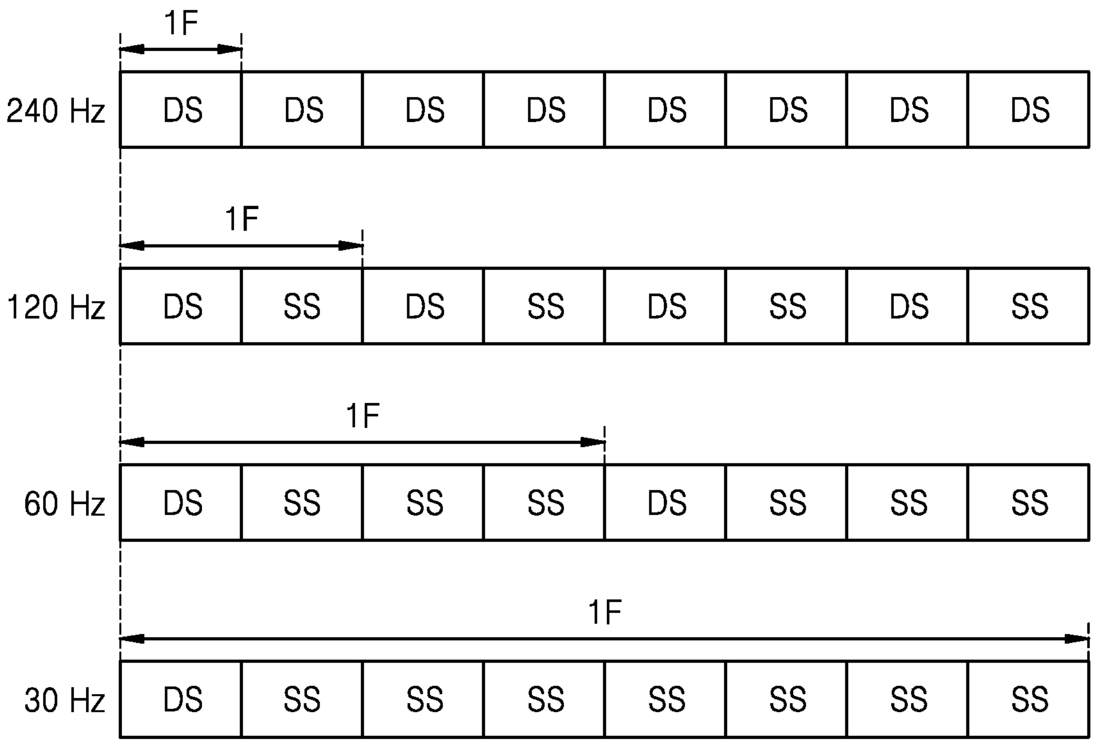
Figure 2C:
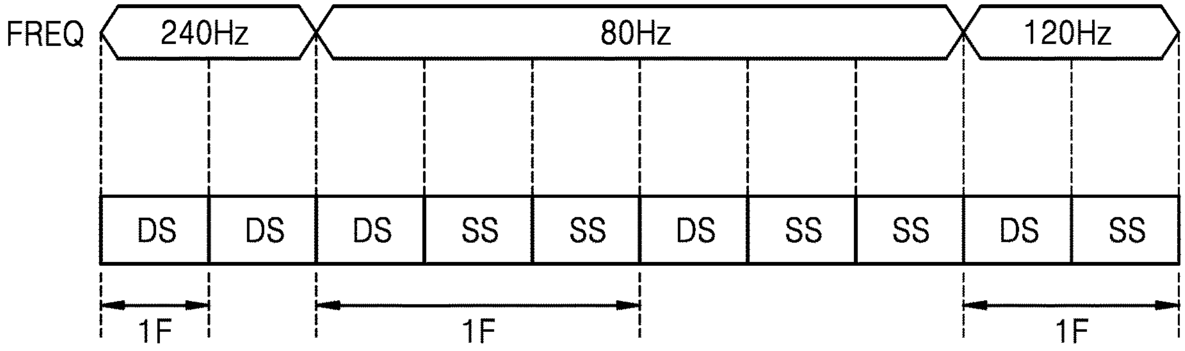

FIG. 1 is a view schematically illustrating a display apparatus according to an embodiment. FIGS. 2A through 2C are schematic diagrams for explaining a driving method of a display apparatus according to a driving frequency (FREQ).

A display apparatus 10 according to embodiments may be implemented as an electronic device, such as a smartphone, a mobile phone, a smart watch, a navigation device, a game machine, a television (TV) shop, a head unit for a vehicle, a laptop computer, a laptop computer, a tablet computer, a personal media player (PMP), or a personal digital assistant (PDA). Also, the electronic device may be a flexible device.

Referring to FIG. 1, the display apparatus 10 may include a pixel unit 110, a gate driving circuit 130, a data driving circuit 150, a power supply circuit 170, and a controller 190.

The pixel unit 110 may include multiple gate lines GL, multiple data lines DL, and multiple pixels PX connected to the gate lines GL and the data lines DL.

The pixels PX may be arranged in various shapes, such as stripe arrangement, PenTile® arrangement, mosaic arrangement, and the like. The pixel unit 110 may be arranged in a display area of a substrate. Each of the pixels PX may include an organic light-emitting diode (OLED) as a display element (a light-emitting device), and the organic light-emitting diode (OLED) may be connected to a pixel circuit. The pixel circuit may include multiple transistors and at least one capacitor.

In an embodiment, some of the transistors included in the pixel circuit may be an N-type oxide thin-film transistor, and some of the transistors included in the pixel circuit may be a P-type silicon thin-film transistor. An oxide thin-film transistor may be a low temperature polycrystalline oxide (LTPO) thin-film transistor in which an active pattern (a semiconductor layer) includes an oxide. However, this is an example, and N-type transistors are not limited thereto. For example, the active pattern (the semiconductor layer) included in the N-type transistor may include an inorganic semiconductor (e.g., amorphous silicon, polysilicon), or an organic semiconductor. The silicon thin-film transistor may be a low temperature polysilicon (LTPS) thin-film transistor in which the active pattern (the semiconductor layer) includes amorphous silicon, polysilicon, and/or the like.

Each pixel PX may emit, for example, red, green, blue or white light through the organic light-emitting diode OLED. Each pixel PX may be connected to at least one corresponding gate line of the gate lines GL and a corresponding data line of the data lines DL.

Each of the gate lines GL may extend in a first direction D1 (e.g., in a row direction) and may be connected to the pixels PX located in the same row. Each of the gate lines GL may transmit a gate signal to the pixels PX in the same row. Each of the data lines DL may extend in a second direction D2 (e.g., in a column direction) and may be connected to the pixels PX located in the same column. Each of the data lines DL may transmit data signals DATA to the pixels PX in the same column.

The gate driving circuit 130 may be connected to the gate lines GL, may generate a gate signal in response to a control signal GCS from the controller 190 and may sequentially supply the gate signal to the gate lines GL. The gate line GL may be connected to a gate of a transistor included in the pixels PX. The gate signal may be a gate control signal for controlling turn-on and turn-off of the transistor of which gate is connected to the gate line GL. The gate signal may be a square wave signal in which an on voltage at which the transistor may be turned on and an off voltage at which the transistor may be turned off, may be repeated. In an embodiment, the on voltage may be a high level voltage (a first level voltage) or a low level voltage (a second level voltage). A period in which the on voltage of the gate signal is maintained (hereinafter, referred to as an 'on voltage period') and a period in which the off voltage of the gate signal is maintained (hereinafter, referred to as an 'off voltage period') may be determined according to the function of a transistor to which a scan signal is applied within the pixels PX. The gate driving circuit 130 may include a multiple stages.

The gate driving circuit 130 may be connected to the gate lines GL and may supply a data signal to the data signals DL in response to the control signal DCS from the controller 190 during a display period. The data signal supplied to the data lines DL may be supplied to the pixels PX to which the gate signal is supplied.

The power supply circuit 170 may generate voltages required to drive the pixels PX in response to the control signal PCS from the controller 190. In case that the display apparatus 10 is an organic electroluminescent light-emitting display apparatus, the power supply circuit 170 may supply a first driving voltage ELVDD and a second driving voltage ELVSS to the pixels PX of the pixel unit 110. The first driving voltage ELVDD may be a high level voltage supplied to a first electrode (a pixel electrode or an anode electrode) of a display element included in the pixels PX. The second driving voltage ELVSS may be a low level voltage supplied to a second electrode (an opposite electrode or a cathode electrode) of the display element included in the pixels PX.

The controller 190 may generate control signals GCS, DCS, and PCS based on signals inputted from the outside and may supply the control signals GCS, DCS, and PCS to the gate driving circuit 130, the data driving circuit 150, and the power supply circuit 170. The control signal GCS outputted to the gate driving circuit 130 may include multiple clock signals and a scan initiation signal. The control signal DCS outputted to the data driving circuit 150 may include a source initiation signal and the clock signals.

The display apparatus 10 may include a display panel, and the display panel may include a substrate. The display apparatus 10 may include a display area in which an image is displayed, and a non-display area outside the display area and surrounding the display area. The pixel unit 110 may be arranged in the display area of the substrate, and outer circuits such as the gate driving circuit 130, the data driving circuit 150, and the power supply circuit 170, may be arranged in the non-display area. For example, a portion or all of the gate driving circuit 130 may be directly formed in the non-display area of the substrate during a process of forming a transistor that constitutes the pixel circuit in the display area of the substrate.

The data driving circuit 150 may be arranged on a flexible printed circuit board (FPCB) electrically connected to a pad disposed at a side of the substrate. In another embodiment, the data driving circuit 150 may be directly arranged on the substrate in a chip on glass (COG) or chip on plastic (COP) manner.

The display apparatus 10 according to an embodiment may support a variable refresh rate (VRR). A refresh rate that is a frequency at which data signals are substantially written into a driving transistor of each pixel PX, may be referred to as a screen scanning rate or a screen reproduction rate and may represent the number of image frames to be reproduced for one second. In an embodiment, the refresh rate may be an output frequency of the gate driving circuit 130 and/or the data driving circuit 150. A frequency corresponding to the refresh rate may be a driving frequency. The display apparatus 10 may adjust an output frequency of the gate driving circuit 130 and an output frequency of the data driving circuit 150 corresponding to the output frequency of the gate driving circuit 130 according to the driving frequency. The display apparatus 10 that supports the VRR may operate by changing the driving frequency within range between a maximum driving frequency and a minimum driving frequency. For example, in case that the refresh rate is about 60 Hz, a gate signal for writing a data signal from the gate driving circuit 130 60 times per second may be supplied to each horizontal line (a pixel row).

Hereinafter, the maximum driving frequency of the display apparatus 10 is referred to as a first driving frequency, and a lower driving frequency than the maximum driving frequency is referred to as a second driving frequency. The display apparatus 10 may operate with a second driving frequency to reduce power consumption. For example, the display apparatus 10 may operate at the second driving frequency and may be driven at a low speed in case that an operation control signal (e.g., a signal inputted from a keyboard) is not inputted for a certain time, in case that a still image is displayed, and in case that the display apparatus 10 is driven in a standby mode.

One frame 1F may include a first scan period DS or may include the first scan period DS and one or more second scan periods SS depending on the driving frequency. In the first scan period DS, a data signal may be inputted to the pixels PX. Thus, the first scan period DS may be defined as a display scan period in which a pixel emits light. An operation in which the data signal is inputted to the pixels PX from the data line DL, may be referred to as a data programming operation. In the second scan period SS, at least one gate signal may be applied, however, the second scan period SS may be defined as a self-scan period in which no data signal is written to the pixels PX. During the second scan period SS, the data signal written during the first scan period DS may be maintained, and a pixel may emit light. A length of the second scan period SS may be the same as a length of the first scan period DS.

In case that the driving frequency is a first driving frequency, one frame 1F may include one first scan period DS. In case that the driving frequency is a second driving frequency, one frame 1F may include one first scan period DS and one or more second scan periods SS. Referring to FIG. 2A, in case that the maximum driving frequency is N Hz, the second driving frequency may be N/n Hz ($n \geq 2$), and in case that the driving frequency is the second driving frequency, a length of one frame 1F may be n times of the length of one frame 1F in case that the driving frequency is the first driving frequency. In case that the driving apparatus 10 operates at the second driving frequency, one frame 1F may include one first scan period DS and ($n-1$) second scan periods SS. FIG. 2B illustrates an example in which the maximum driving frequency is 240 Hz and the second driving frequency decreases to 120 Hz, 60 Hz and 30 Hz. In FIG. 2B, in case that the second driving frequency is 120 Hz, one frame 1F may include one first scan period DS and one second scan period SS, and in case that the second driving frequency is 30 Hz, one frame 1F may include one first scan period DS and 7 second scan periods SS. As shown in FIG. 2C, the display apparatus 10 may display an image while changing the driving frequency into 240 Hz, 80 Hz, and 120 Hz according to the refresh rate.

In FIG. 1, the pixels PX are connected to one gate line GL. However, this is an example, and as shown in pixel circuits to be described later, the pixels PX may be connected to two or more gate lines, and the gate driving circuit 130 may supply two or more gate signals having different timings at which an on voltage is applied, to corresponding gate lines.

Figure 3:
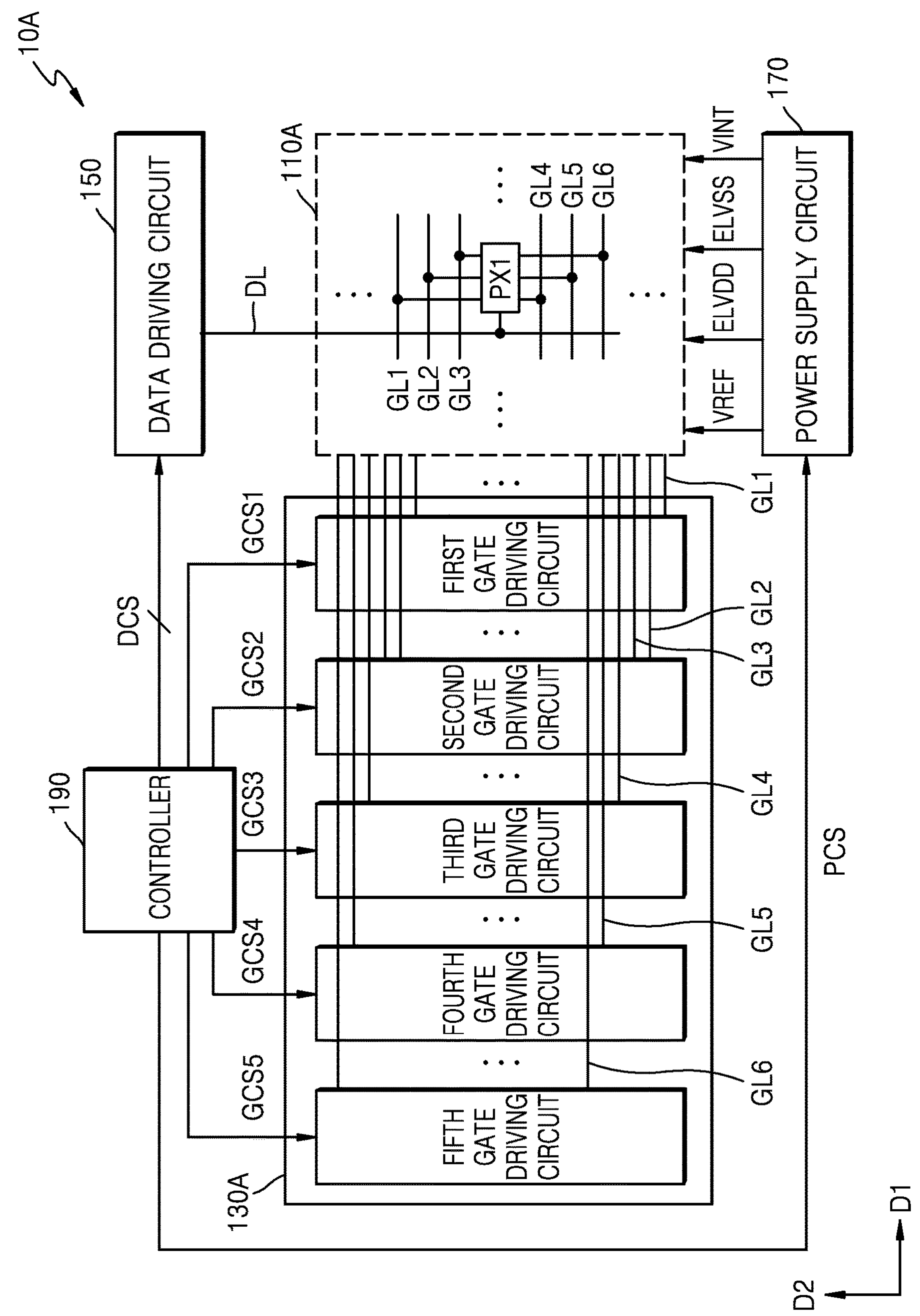
FIG. 3 is a view schematically illustrating a display apparatus according to an embodiment.
Figure 4:
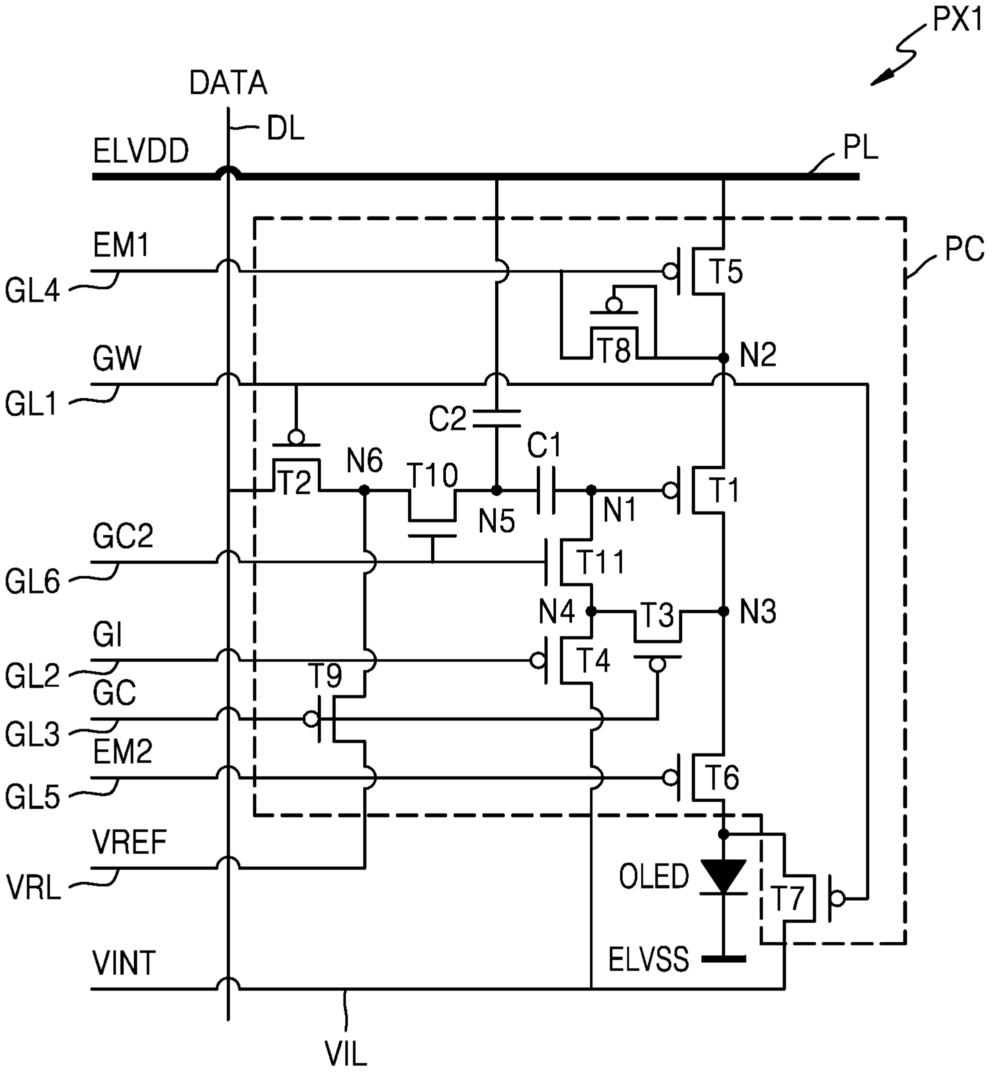
FIG. 4 is a schematic diagram of an equivalent circuit illustrating a pixel of FIG. 3.

FIG. 3 is a view schematically illustrating a display apparatus according to an embodiment. FIG. 4 is a schematic diagram of a circuit illustrating a pixel of FIG. 3.

Referring to FIG. 3, a display apparatus 10A may include a pixel unit 110A, a gate driving circuit 130, a data driving circuit 150, a power supply circuit 170, and a controller 190. Hereinafter, a detailed description of the same configuration as that of the display apparatus 10 shown in FIG. 1 will be omitted, and differences therebetween will be described later.

The pixel unit 110A may include multiple pixels PX1, and each of the pixels PX1 may be connected to a data line DL and first through sixth gate lines GL1 to GL6.

The gate driving circuit 130A may be connected to the first through sixth gate lines GL1 to GL6 and may sequentially supply first through sixth gate signals GW, GI, GC, EM1, EM2, and GC2 to the first through sixth gate lines GL1 to GL6, respectively. The gate driving circuit 130A may include first through fifth gate driving circuits. Each of the first through fifth gate driving circuits may include multiple stages.

The first gate driving circuit may be connected to multiple first gate lines GL1 and may sequentially supply a first gate signal GW to the first gate lines GL. The second gate driving circuit may be connected to multiple second gate lines GL2 and a plurality of third gate lines GL3 and may sequentially supply a second gate signal GI to the second gate lines GL2 and may sequentially supply a third gate signal GC to the third gate lines GL3. The third gate driving circuit may be connected to multiple fourth gate lines GL4 and may sequentially supply a fourth gate signal EM1 to the fourth gate lines GL4. The fourth gate driving circuit may be connected to multiple fifth gate lines GL5 and may sequentially supply a fifth gate signal EM2 to the fifth gate lines GL5. The fifth gate driving circuit may be connected to multiple sixth gate lines GL6 and may sequentially supply a sixth gate signal GC2 to the sixth gate lines GL6.

In an embodiment, the first through sixth gate signals GW, GI, GC, EM1, EM2, and GC2 may be respectively supplied to the first through sixth gate lines GL1 to GL6 of each pixel row at a certain timing. In another embodiment, the first gate signal GW may be sequentially supplied to the first gate line GL1 of each pixel row at a certain timing, and the second through sixth gate signals GI, GC, EM1, EM2, and GC2 may be sequentially and respectively supplied to second through sixth gate lines GL2 to GL6 of two pixel rows and may be sequentially supplied in the unit of two pixel rows. For example, the fifth gate driving circuit may simultaneously supply the fifth gate signal EM2 to two fifth gate lines GL5 of two pixel rows and may be sequentially supplied in the unit of two pixel rows.

The power supply circuit 170 may supply the first driving voltage ELVDD and the second driving voltage ELVSS to pixels PX1 of the pixel unit 110A. The power supply circuit 170 may further generate a reference voltage VREF and an initialization voltage VINT and may supply the reference voltage VREF and the initialization voltage VINT to the pixels PX of the pixel unit 110A.

The controller 190 may generate control signals GCS1 to GCS5, DCS, and PCS based on signals inputted from the outside and may supply the control signals GCS1 to GCS5, DCS, and PCS to the gate driving circuit 130A, the data driving circuit 150, and the power supply circuit 170. The controller 190 may supply a corresponding control signal of the control signals GCS1 to GCS5 to each of the first through fifth gate driving circuits of the gate driving circuit 130A.

Referring to FIG. 4 together, the pixel PX1 may include a pixel circuit PC and an organic light-emitting diode OLED as a display element connected to the pixel circuit PC.

The pixel circuit PC of the pixel PX1 may include first through eleventh transistors T1 to T11, a first capacitor C1, a second capacitor C2, and signal lines connected thereto. The signal lines may include a data line DL, a first gate line GL1, a second gate line GL2, a third gate line GL3, a fourth gate line GL4, a fifth gate line GL5, a sixth gate line GL6, a driving voltage line PL, a reference voltage line VRL, and an initialization voltage line VIL.

The first transistor T1 may be a driving transistor in which the magnitude of a source-drain current is determined according to a gate-source voltage Vgs, and the second through eleventh transistors T2 to T11 may be switching transistors that are substantially turned on/off according to a gate voltage. The first through eleventh transistors T1 to T11 may be implemented with thin-film transistors. According to the type (p-type or n-type) of the transistor and/or operating conditions, a first terminal of each of the first through eleventh transistors T1 to T11 may be a source or drain, and a second terminal of each of the first through eleventh transistors T1 to T11 may be a terminal different from the first terminal. For example, in case that the first terminal is a source, the second terminal may be a drain.

The first through ninth transistors T1 to T9 may be a P-type silicon thin-film transistor, and the tenth transistor T10 and the eleventh transistor T11 may be N-type oxide thin-film transistors. An on voltage of the gate signal for turning on the first through ninth transistors T1 to T9 may be a low level voltage (a second level voltage). An on voltage of the gate signal for turning on the tenth transistor T10 and the eleventh transistor T11 may be a high level voltage (a first level voltage).

The first transistor T1 may be connected between the driving voltage line PL and the organic light-emitting diode OLED. The first transistor T1 may be connected to the driving voltage line PL via the fifth transistor T5 and may be electrically connected to the organic light-emitting diode OLED via the sixth transistor T6. The first transistor T1 may include a gate connected to the first node N1, a first terminal connected to the second node N2, and a second terminal connected to the third node N3. The first transistor T1 may receive a data signal DATA according to a switching operation of the second transistor T2 and may supply a driving current to the organic light-emitting diode OLED.

The second transistor T2 (a data writing transistor) may be connected between the data line DL and the first node N1. The second transistor T2 may be connected between the data line DL and the sixth node N6. The second transistor T2 may include a gate connected to the first gate line GL1, a first terminal connected to the data line DL, and a second terminal connected to the sixth node N6. The second transistor T2 may be turned on according to the first gate signal GW transmitted through the first gate line GL1 and may perform a switching operation of transmitting the data signal DATA transmitted to the data line DL to the sixth node N6.

The third transistor T3 (a compensation transistor) may be connected between the third node N3 and the fourth node N4. The third transistor T3 may be connected to the organic light-emitting diode OLED via the sixth transistor T6. The third transistor T3 may include a gate connected to the third gate line GL3, a first terminal connected to the third node N3, and a second terminal connected to the fourth node N4.

The fourth transistor T4 (a first initialization transistor) may be connected between the fourth node N4 and an initialization voltage line VIL. The fourth transistor T4 may include a gate connected to the second gate line GL2, a first terminal connected to the fourth node N4, and a second terminal connected to the initialization voltage line VIL.

The fifth transistor T5 (a first emission control transistor) may be connected between the driving voltage line PL and the second node N2. The sixth transistor T6 (a second emission control transistor) may be connected between the third node N3 and the organic light-emitting diode OLED. The fifth transistor T5 may include a gate connected to the fourth gate line GL4, a first terminal connected to the driving voltage line PL, and a second terminal connected to the second node N2. The sixth transistor T6 may include a gate connected to the fifth gate line GL5, a first terminal connected to the third node N3, and a second terminal connected to a pixel electrode of the organic light-emitting diode OLED. In case that the fifth transistor T5 and the sixth transistor T6 are simultaneously turned on, a driving current may flow through the organic light-emitting diode OLED.

The seventh transistor T7 (a second initialization transistor) may be connected between the organic light-emitting diode OLED and the initialization voltage line VIL. The seventh transistor T7 may include a gate connected to the first gate line GL1, a first terminal connected to the second terminal of the sixth transistor T6 and the pixel electrode of the organic light-emitting diode OLED, and a second terminal connected to the initialization voltage line VIL. A gate of the seventh transistor T7 may be connected to the gate of the second transistor T2. The seventh transistor T7 may be turned on in response to the first gate signal GW transmitted through the first gate line GL1, may transmit the initialization voltage VINT to the pixel electrode of the organic light-emitting diode OLED and may initialize the pixel electrode of the organic light-emitting diode OLED.

The eighth transistor T8 (a bias control transistor) may be connected between the second node N2 and the fourth node N4. The eighth transistor T8 may include a first terminal connected to the fourth gate line GL4 and a second terminal connected to the first terminal of the first transistor T1. The eighth transistor T8 may be implemented as a diode in case that the gate and the second terminal of the eighth transistor T8 are connected to each other. The eighth transistor T8 may be turned on and may transmit a fourth gate signal EM1 to the first terminal of the first transistor T1 and may control a gate-source voltage of the first transistor T1.

The ninth transistor T9 (a third initialization transistor) may be connected between the sixth node N6 and a reference voltage line VRL. The ninth transistor T9 may include a gate connected to the third gate line GL3, a first terminal connected to the sixth node N6, and a second terminal connected to the reference voltage line VRL. A gate of the ninth transistor T9 may be connected to the gate of the third transistor T3. The ninth transistor T9 may be turned on in response to the third gate signal GC transmitted through the third gate line GL3 and may transmit the reference voltage VREF to the sixth node N6 to initialize the sixth node N6.

The tenth transistor T10 (a first node control transistor) may be connected between the fifth node N5 and the sixth node N6. The tenth transistor T10 may include a gate connected to the sixth gate line GL6, a first terminal connected to the sixth node N6, and a second terminal connected to the fifth node N5. The tenth transistor T10 may be turned on in response to the sixth gate signal GC2 transmitted through the sixth gate line GL6 and may electrically connect the sixth node N6 and the fifth node N5 to each other to transmit a data signal of the sixth node N6 to the fifth node N5.

The eleventh transistor T11 (a second node control transistor) may be connected between the first node N1 and the fourth node N4. The eleventh transistor T11 may include a gate connected to the sixth gate line GL6, a first terminal connected to the first node N1, and a second terminal connected to the fourth node N4. A gate of the eleventh transistor T11 may be connected to the gate of the tenth transistor T10. By turning on the eleventh transistor T11, the initialization voltage VINT may be supplied to the first node N1 (or a gate of the first transistor T1), or the first transistor T1 may be diode-connected. The eleventh transistor T11 may be turned on in response to the sixth gate signal GC2 transmitted through the sixth gate line GL6 and may electrically connect the fourth node N4 and the first node N1 to each other and may transmit the initialization voltage VINT of the fourth node N4 to the first node N1 to initialize the gate of the first transistor T1. In case that the eleventh transistor T11 is turned on simultaneously with the third transistor T3, the eleventh transistor T11 may diode-connect the first transistor T1, thereby compensating for a threshold voltage of the first transistor T1.

The first capacitor C1 may be connected between the first node N1 and the fifth node N5. The second capacitor C2 may be connected between the fifth node N5 and the driving voltage line PL.

The organic light-emitting diode OLED may include a pixel electrode (e.g., an anode) and an opposite electrode (e.g., a cathode) facing the pixel electrode, and the second driving voltage ELVSS may be applied to the opposite electrode. The organic light-emitting diode OLED may receive a driving current corresponding to the data signal DATA from the first transistor T1 to emit light of a certain color, thereby displaying an image.

Figure 5:
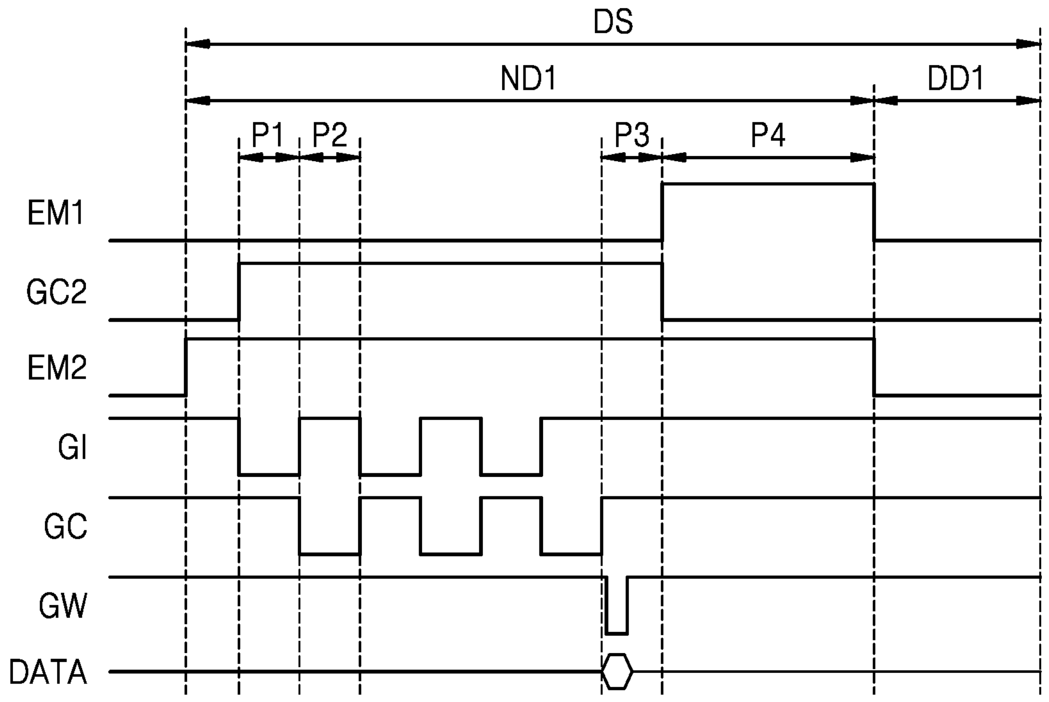
FIGS. 5 and 6 are schematic waveform diagrams for explaining an operation of a pixel according to an embodiment.
Figure 6:
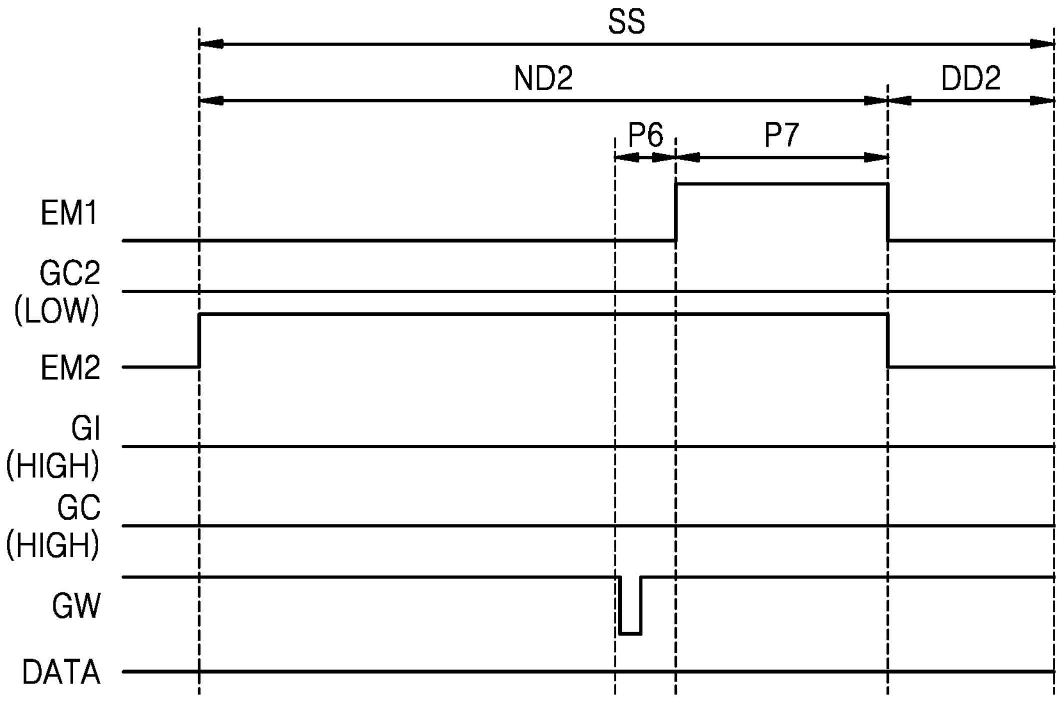

FIGS. 5 and 6 are schematic waveform diagrams for explaining an operation of a pixel according to an embodiment. FIG. 5 is a waveform diagram of signals applied to the pixel PX1 of FIG. 4 during a first scan period. FIG. 6 is a waveform diagram of signals applied to the pixel PX1 of FIG. 4 during a second scan period.

Referring to FIG. 5, the first scan period DS may include a first non-emission period ND1 in which the pixel PX1 does not emit light, and a first emission period DD1 in which a pixel emits light. The first non-emission period ND1 may include first through fourth periods P1 to P4.

The gate driving circuit 130A may supply first through sixth gate signals GW, GC, EM1, EM2, and GC2 to first through sixth gate lines GL1, GL2, GL3, GL4, GL5, and GL6, respectively. Start timings and ending timings of an on voltage maintenance period and an off voltage maintenance period of the first through sixth gate signals GW, GI, GC, EM1, EM2, and GC2 may be the same or different from each other, and some signals may overlap each other in some periods.

The first driving voltage ELVDD may be supplied from the driving voltage line PL, and the reference voltage VREF may be supplied from the reference voltage line VRL, and the initialization voltage VINT may be supplied from the initialization voltage line VIL.

The first period P1 may be an initialization period in which the first node N1 to which the gate of the first transistor T1 is connected, is initialized. During the first period P1, the second gate signal GI of a second level voltage may be supplied to the second gate line GL2, and the sixth gate signal GC2 of a first level voltage may be supplied to the sixth gate line GL6. The first gate signal GW, the third gate signal GC, and the fifth gate signal EM2 may be supplied as the first level voltage, and the fourth gate signal EM1 may be supplied as the second level voltage. The fourth transistor T4 may be turned on by the second gate signal GI, and the eleventh transistor T11 may be turned on by the sixth gate signal GC2, and the gate of the first transistor T1 may be initialized as the initialization voltage VINT.

The second period P2 may be a compensation period in which the threshold voltage of the first transistor T1 is compensated for. During the second period P2, the third gate signal GC of a second level voltage may be supplied to the third gate line GL3, and the sixth gate signal GC2 of a first level voltage may be supplied to the sixth gate line GL6. The first gate signal GW, the second gate signal GI, and the fifth gate signal EM2 may be supplied as the first level voltage, and the fourth gate signal EM1 may be supplied as the second level voltage. The third transistor T3 and the ninth transistor T9 may be turned on by the third gate signal GC, and the tenth transistor T10 and the eleventh transistor T11 may be turned on by the sixth gate signal GC2, and the fifth transistor T5 may be turned on by the fourth gate signal EM1. Thus, the first driving voltage ELVDD may be supplied to the second node N2, the reference voltage VREF may be supplied to the fifth node N5 electrically connected to the sixth node N6, and the first transistor T1 may be turned on. The first transistor T1 in a diode-connected state may be turned off in case that a voltage of the third node N3 is dropped to be less than a difference VREF-Vth between the reference voltage VREF and the threshold voltage Vth of the first transistor T1, and a voltage corresponding to the threshold voltage Vth of the first transistor T1 may be charged in the first capacitor C1.

The first period P1 and the second period P2 may be alternately repeated multiple times. FIG. 5 illustrates an example in which the first period P1 and the second period P2 are alternately repeated three times.

The third period P3 may be a data writing period (a data programming period) in which a data signal is applied. During the third period P3, a voltage corresponding to the data signal may be stored in a gate of the driving transistor (the first transistor). During the third period P3, the first gate signal GW of a second level voltage may be supplied to the first gate line GL1, and the sixth gate signal GC2 of a first level voltage may be supplied to the sixth gate line GL6. The second gate signal GI, the third gate signal GC, and the fifth gate signal EM2 may be supplied as the first level voltage, and the fourth gate signal EM1 may be supplied as the second level voltage. The second transistor T2 and the seventh transistor T7 may be turned on by the first gate signal GW, and the tenth transistor T10 and the eleventh transistor T11 may be turned on by the sixth gate signal GC2, and the fifth transistor T5 may be turned on by the fourth gate signal EM1.

The second transistor T2 may transmit the data signal DATA from the data line DL to the sixth node N6, and the tenth transistor T10 may transmit the data signal DATA to the fifth node N5. Thus, a voltage of the fifth node N5 may be changed by a voltage corresponding to a difference between the reference voltage VREF and the data signal DATA, and a voltage of the first node N1 may be changed according to a voltage change amount of the fifth node N5. Thus, the threshold voltage Vth of the first transistor T1 and a data voltage VDATA corresponding to the data signal DATA may be charged in the first capacitor C1. The third node N3, i.e., a pixel electrode of the organic light-emitting diode OLED may be initialized as the initialization voltage VINT by the turned on seventh transistor T7.

The fourth period P4 may be a biasing period in which voltage-current characteristics of the first transistor T1 are compensated for. An afterimage phenomenon of a previous image generated in case that an image is displayed may be due to a hysteresis characteristic of the driving transistor. A certain bias voltage may be supplied to a source and/or a drain of the first transistor T1 during the fourth period P4 so that a gate-source voltage Vgs of the first transistor T1 may be controlled and thus the threshold voltage of the first transistor T1 may be shifted. Thus, a change in voltage-current characteristics due to the hysteresis characteristics of the first transistor T1 may be compensated for.

In an embodiment, during the fourth period P4, a bias voltage may be supplied to a first terminal (source) of the first transistor T1, and the first transistor T1 may be controlled in an on-bias state. The on-bias state of the first transistor T1 may be a state in which the gate-source voltage Vgs of the first transistor T1 is controlled with a white grayscale voltage and a drain-source current Ids of the first transistor T1 corresponds to the white grayscale. The drain-source current Ids corresponding to the white grayscale may be the largest current.

During the fourth period P4, the fourth gate signal EM1 of the first level voltage may be supplied to the fourth gate line GL4, and the fifth gate signal EM2 of a first level voltage may be supplied to the fifth gate line GL5. The first gate signal GW, the second gate signal GI, and the third gate signal GC may be supplied as the first level voltage, and the sixth gate signal GC2 may be supplied as the second level voltage. The fifth transistor T5 and the sixth transistor T6 may be turned off by the fourth gate signal EM1 and the fifth gate signal EM2, and the fourth gate signal EM1 of the first level voltage may be supplied to the second node N2 through the eighth transistor T8 in the diode-connection state so that the first transistor T1 may be controlled in an on-bias state. The first level voltage of the fourth gate signal EM1 may be greater than the first driving voltage ELVDD.

The first emission period DD1 may be a period in which the organic light-emitting diode OLED emits light. During the first emission period DD1, the fourth gate signal EM1 and the fifth gate signal EM2 may be supplied as the second level voltage. The first gate signal GW, the second gate signal GI, and the third gate signal GC may be supplied as the first level voltage, and the sixth gate signal GC2 may be supplied as the second level voltage. The fifth transistor T5 and the sixth transistor T6 may be turned on by the fourth gate signal EM1 and the fifth gate signal EM2 so that a current path from the driving voltage line PL to the organic light-emitting diode OLED may be formed. The first transistor T1 may output a driving current having a magnitude corresponding to the data voltage VDATA stored in the first capacitor C1, and the organic light-emitting diode OLED may emit light with luminance corresponding to the magnitude of a driving current Id independent of the threshold voltage Vth of the first transistor T1.

In an embodiment, during the first period P1, the eighth transistor T8 may be turned off by the fourth gate signal EM1 of the second level voltage. However, the initialization voltage VINT may be supplied to the gate of the first transistor T1 so that the gate-source voltage Vgs of the first transistor T1 may be changed and thus the first transistor T1 may be controlled in an on bias state. Thus, the first period P1, which is an initialization period, may also serve as a biasing period for compensating for a change in the voltage-current characteristic of the first transistor T1.

Referring to FIG. 6, the second scan period SS may include a second non-emission period ND2 and a second emission period DD2, and the second non-emission period ND2 may include a sixth period P6 and a seventh period P7. The second scan period SS may not include periods that correspond to the first period P1 and the second period P2 of the first scan period DS.

During the second non-emission period ND2 and the second non-emission period DD2, the second gate signal GI and the third gate signal GC may be supplied as the first level voltage, and the sixth gate signal GC2 may be supplied as the second level voltage. The fourth gate signal EM1 may be supplied as the first level voltage during the seventh period P7 and may be supplied as the second level voltage during other periods. The fifth gate signal EM2 may be supplied as the first level voltage during the second period ND2 and may be supplied as the second level voltage during the second emission period DD2.

During the sixth period P6 corresponding to the third period P3 of the first scan period DS, the first gate signal GW may be supplied as the second level voltage so that the second transistor T2 may be turned on. However, since the data signal is not supplied to the data line DL, the tenth transistor T10 and the eleventh transistor T11 are turned off, the gate-source voltage Vgs of the first transistor T1 may not be affected by the driving of the second scan period SS. The pixel electrode of the organic light-emitting diode OLED may be initialized as the initialization voltage VINT by the seventh transistor T7 turned on by the first gate signal GW.

The seventh period P7 may be a biasing period corresponding to the fourth period P4 of the first scan period DS. The fourth gate signal EM1 and the fifth gate signal EM2 may be supplied as the first level voltage during the seventh period P7 so that the fifth transistor T5 and the sixth transistor T6 may be turned off, and the fourth gate signal EM1 of the first level voltage may be supplied to the second node N2 through the eighth transistor T8 in the diode-connection state, and the first transistor T1 may be controlled in an on bias state.

The fourth gate signal EM1 and the fifth gate signal EM2 may be supplied as the second level voltage during the second emission period DD2 so that the fifth transistor T5 and the sixth transistor T6 may be turned on, and the first transistor T1 may output a driving current having a magnitude corresponding to the data voltage VDATA, and the organic light-emitting diode OLED may emit light with luminance corresponding to the magnitude of the driving current Id.

As shown in FIGS. 5 and 6, the first gate signal GW may be supplied during the first scan period DS and the second scan period SS, respectively, and data writing may be performed only during the first scan period DS. Thus, the first gate signal GW may be supplied at a first driving frequency, and initialization of the pixel electrode of the organic light-emitting diode OLED may be performed according to the first driving frequency, and data writing may be performed according to the second driving frequency. The biasing period of the fourth period P4 and the seventh period P7 is included in the first scan period DS and the second scan period SS so that control of the on bias state of the first transistor T1 may be performed at the first driving frequency. Because the second gate signal GI, the third gate signal GC and the sixth gate signal GC2 are supplied only during the first scan period DS, the second gate signal GI, the third gate signal GC, and the sixth gate signal GC2 may be supplied at the second driving frequency. Here, the supply of the signal may mean that the on voltage of the signal is supplied.

In FIG. 6, the first gate signal GW may be supplied as the second level voltage during the sixth period P6. However, this is an example, and in case that the sixth gate signal GC2 is at a second level voltage during the second scan period SS, the first gate signal GW may be supplied as the second level voltage during the second scan period SS and/or the second gate signal GI and the third gate signal GC may also be supplied as the second level voltage.

Figure 7:
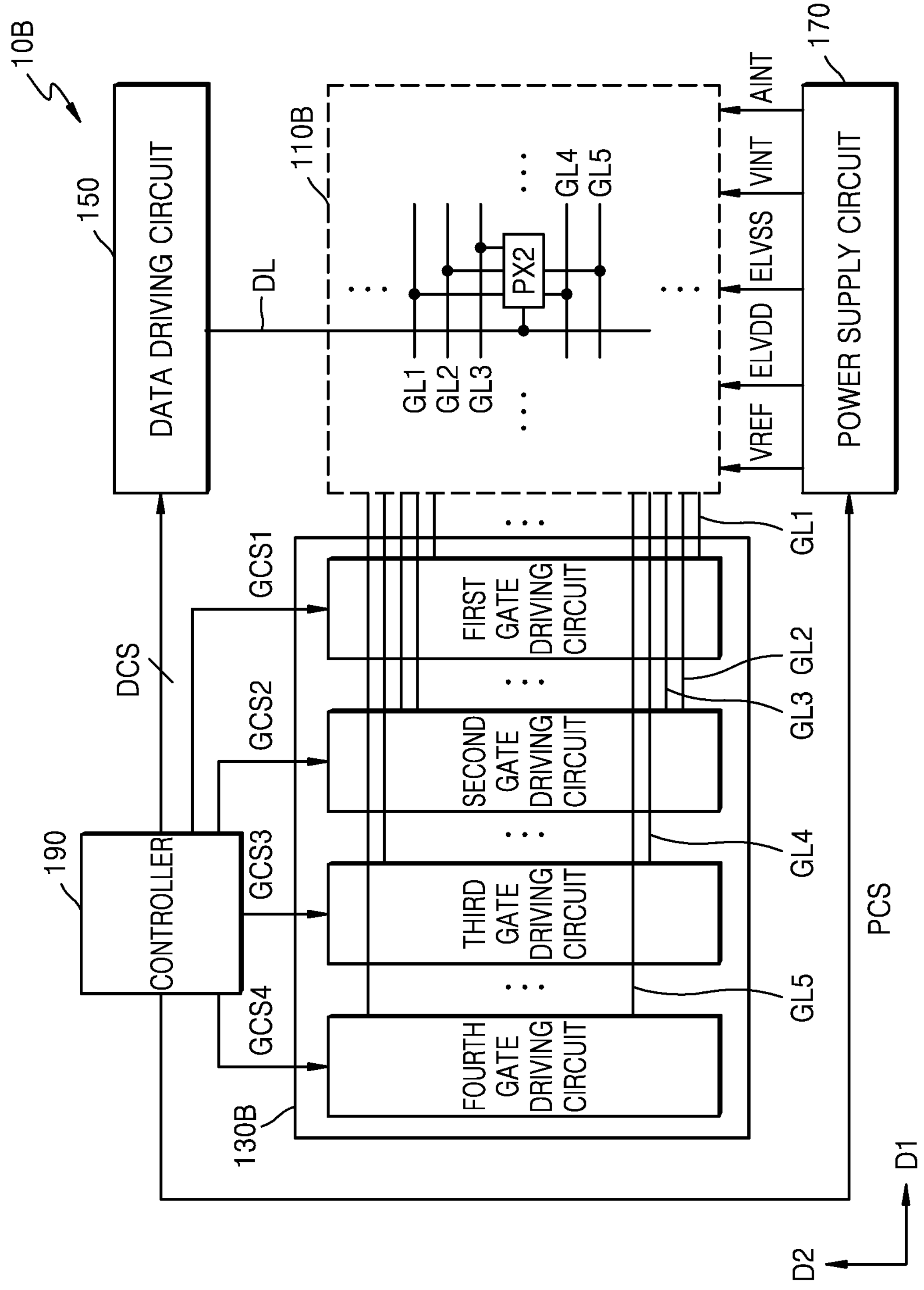
FIG. 7 is a view schematically illustrating a display apparatus according to an embodiment.
Figure 8:
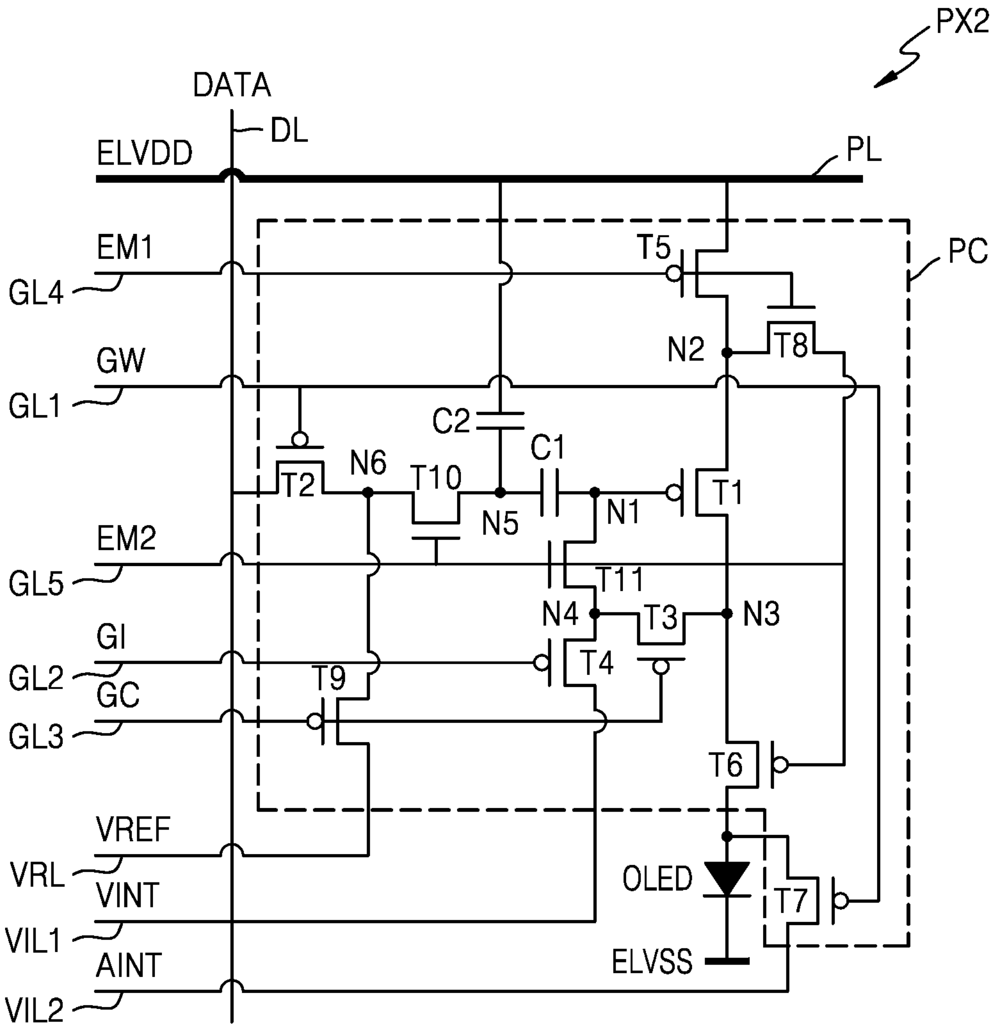
FIG. 8 is a schematic diagram of an equivalent circuit of a pixel of FIG. 7.

FIG. 7 is a view schematically illustrating a display apparatus according to an embodiment. FIG. 8 is a schematic diagram of an equivalent circuit of a pixel of FIG. 7.

Referring to FIG. 7, a display apparatus 10B may include a pixel unit 110B, a gate driving circuit 130B, a data driving circuit 150, a power supply circuit 170, and a controller 190. Because the display apparatus 10B of FIG. 7 is the same as or similar to the display apparatus 10A of FIG. 3 except for the configuration of the gate driving circuit 130B, the same reference numerals are used for the same or corresponding elements, and a redundant description thereof is omitted.

The pixel unit 110B may include multiple pixels PX2, and each of the pixels PX2 may be connected to a data line DL and first through fifth gate lines GL1 to GL5. The pixel unit 110B may be different from the pixel unit 110A of FIG. 3 at least in that the sixth gate line GL6 to which the sixth gate signal GC2 is supplied, is omitted.

The gate driving circuit 130B may be connected to the first through fifth gate lines GL1 to GL5 and may sequentially supply first through fifth gate signals GW, GI, GC, EM1, and EM2 to the first through fifth gate lines GL1 to GL5, respectively. The gate driving circuit 130B may be different from the gate driving circuit 130A of FIG. 3 at least in that a fifth gate driving circuit for supplying the sixth gate signal GC2 to the sixth gate lines GL6 is omitted. Each of the first through fifth gate driving circuits may include multiple stages.

The data driving circuit 150 may supply data signals to the data lines DL in response to a control signal DCS from the controller 190.

The power supply circuit 170 may supply the first driving voltage ELVDD and the second driving voltage ELVSS to pixels PX2 of the pixel unit 110. The power supply circuit 170 may further generate a reference voltage VREF, a first initialization voltage VINT, and a second initialization voltage AINT and may supply the reference voltage VREF, the first initialization voltage VINT, and the second initialization voltage AINT to the pixels PX2 of the pixel unit 110.

The controller 190 may generate control signals GCS1 to GCS4, DCS, and PCS based on signals inputted from the outside and may supply the control signals GCS1 to GCS4, DCS, and PCS to the gate driving circuit 1308, the data driving circuit 150, and the power supply circuit 170. The controller 190 may supply a corresponding control signal of the control signals GCS1 to GCS4 to each of the first through fourth gate driving circuits of the gate driving circuit 1308.

Referring to FIG. 8, the pixel PX2 may include a pixel circuit PC and an organic light-emitting diode OLED as a display element connected to the pixel circuit PC. The pixel circuit PC of FIG. 8 is the same as or similar to the pixel circuit of FIG. 4 except for a portion of the fourth transistor T4, the seventh transistor T7, the eighth transistor T8, the tenth transistor T10, and the eleventh transistor T11, and thus, same reference numerals are used for same or corresponding elements, and a redundant description thereof is omitted.

The pixel circuit PC of the pixel PX2 may include first through eleventh transistors T1 to T11, a first capacitor C1, a second capacitor C2, and signal lines connected thereto. The signal lines may include a data line DL, a first gate line GL1, a second gate line GL2, a third gate line GL3, a fourth gate line GL4, a fifth gate line GL5, a driving voltage line PL, a reference voltage line VRL, a first initialization voltage line VIL1, and a second initialization voltage line VIL2.

The fourth transistor T4 may be connected between the fourth node N4 and the first initialization voltage line VIL1. The fourth transistor T4 may include a gate connected to the second gate line GL2, a first terminal connected to the fourth node N4, and a second terminal connected to the first initialization voltage line VIL1. The fourth transistor T4 may be turned on in response to the second gate signal GI transmitted through the second gate line GL2, and in case that the fourth transistor T4 is turned on simultaneously with the eleventh transistor T11, the fourth transistor T4 may transmit the first initialization voltage VINT to the first node N1 to initialize the gate of the first transistor T1.

The seventh transistor T7 may be connected between the organic light-emitting diode OLED and the second initialization voltage line VIL2. The seventh transistor T7 may include a gate connected to the first gate line GL1, a first terminal connected to the pixel electrode of the organic light-emitting diode OLED, and a second terminal connected to the second initialization voltage line VIL2. A first terminal of the seventh transistor T7 may be connected to the second terminal of the sixth transistor T6. The seventh transistor T7 may be turned on in response to the first gate signal GW transmitted through the first gate line GL1, may transmit the second initialization voltage AINT to the pixel electrode of the organic light-emitting diode OLED and may initialize a voltage of the pixel electrode of the organic light-emitting diode OLED.

The eighth transistor T8 may be connected between the second node N2 and the fifth gate line GL5 (or a gate of the sixth transistor T6). The eighth transistor T8 may include a gate connected to the fourth gate line GL4, a first terminal connected to the second node N2, and a second terminal connected to the fifth gate line GL5. The second terminal may be connected to a gate of the sixth transistor T6. The eighth transistor T8 may be turned on in response to the fourth gate signal EM1 transmitted through the fourth gate line GL4 and may transmit the fifth gate signal EM2 to the first terminal (the second node N2) of the first transistor T1 to control the gate-source voltage of the first transistor T1.

The tenth capacitor T10 may be connected between the fifth node N5 and the sixth node N6. The tenth transistor T10 may include a gate connected to the fifth gate line GL5, a first terminal connected to the sixth node N6, and a second terminal connected to the fifth node N5. The tenth transistor T10 may be turned on in response to the fifth gate signal EM2 transmitted through the fifth gate line GL5 and may electrically connect the sixth node N6 and the fifth node N5 to each other to transmit a data signal of the sixth node N6 to the fifth node N5.

The eleventh capacitor T11 may be connected between the first node N1 and the fifth node N4. The eleventh transistor T11 may include a gate connected to the fifth gate line GL5, a first terminal connected to the first node N1, and a second terminal connected to the fourth node N4. By turning on the eleventh transistor T11, the initialization voltage VINT may be supplied to the first node N1 (or a gate of the first transistor T1), or the first transistor T1 may be diode-connected. The eleventh transistor T11 may be turned on in response to the fifth gate signal EM2 transmitted through the fifth gate line GL5 and may electrically connect the fourth node N4 and the first node N1 to each other and may transmit the first initialization voltage VINT of the fourth node N4 to the first node N1 to initialize the gate of the first transistor T1. In case that the eleventh transistor T11 is turned on simultaneously with the third transistor T3, the eleventh transistor T11 may diode-connect the first transistor T1, thereby compensating for a threshold voltage of the first transistor T1.

Figure 9:
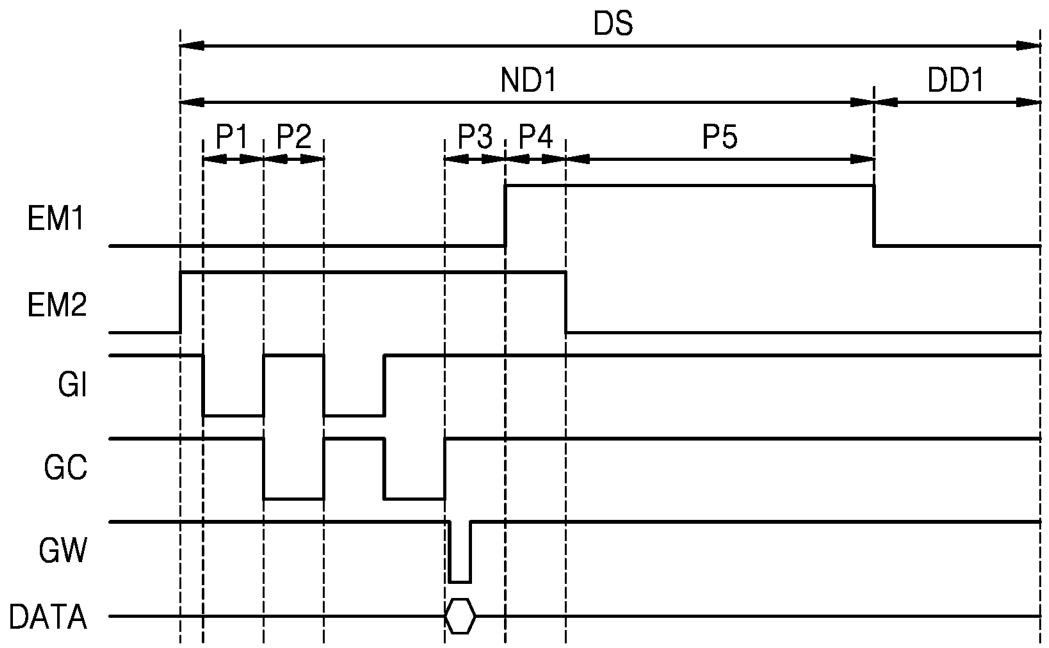
FIGS. 9 and 10 are schematic waveform diagrams for explaining an operation of a pixel according to an embodiment.
Figure 10:
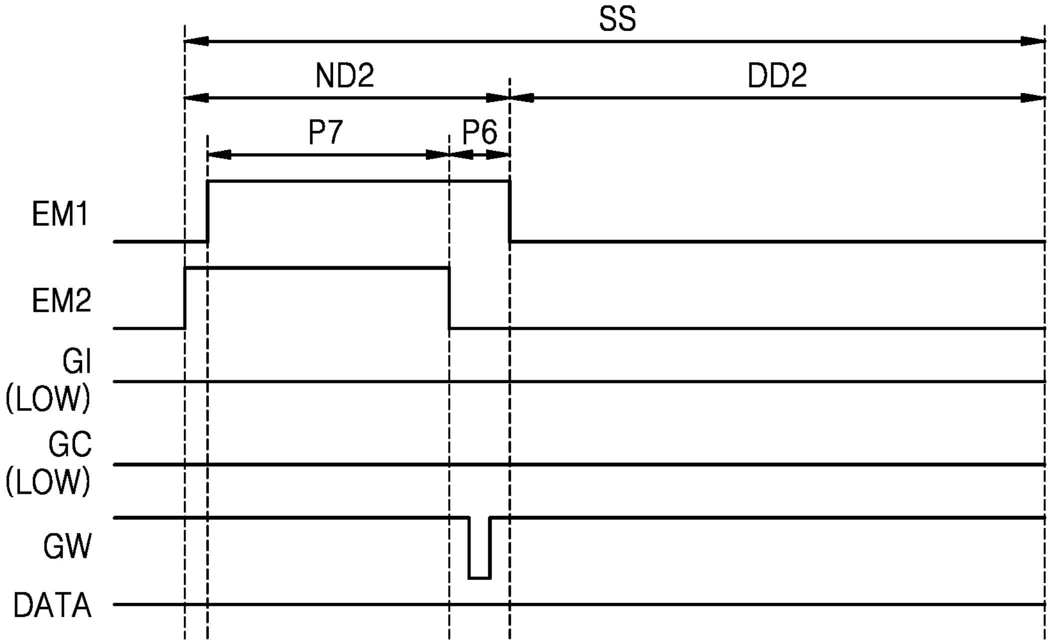

FIGS. 9 and 10 are schematic waveform diagrams for explaining an operation of a pixel according to an embodiment. FIG. 9 is a waveform diagram of signals applied to the pixel PX2 of FIG. 8 during a first scan period. FIG. 10 is a waveform diagram of signals applied to the pixel PX2 of FIG. 8 during a second scan period. Hereinafter, a detailed description of the same contents as the operation of the pixel circuit and the function of the pixel element described with reference to FIGS. 5 and 6 will be omitted.

Referring to FIG. 9, a first scan period DS may include a first non-emission period ND1 and a first emission period DD. The first non-emission period ND1 may include first through fifth periods P1 to P5.

First through fifth gate signals GW, GI, GC, EM1, and EM2 may be supplied from the first through fifth gate lines GL1, GL2, GL3, GL4, and GL5, respectively. On voltage of the first through fifth gate signals GW, GI, GC, EM1, and EM2 may be second level voltage. Start timings and ending timings of an on voltage maintenance period and an off voltage maintenance period of the first through fifth gate signals GW, GI, GC, EM1, and EM2 may be the same or different from each other, and some signals may overlap each other in some periods.

A first driving voltage ELVDD may be supplied from a driving voltage line PL, and a reference voltage VREF may be supplied from a reference voltage line VRL, and a first initialization voltage VINT may be supplied from a first initialization voltage line VIL1, and a second initialization voltage AINT may be supplied from a second initialization voltage line VIL2.

A first period P1 may be an initialization period in which a first node N1 to which a gate of the first transistor T1 is connected, is initialized. During the first period P1, a second gate signal GI of a second level voltage may be supplied to the second gate line GL2, and a fourth gate signal EM1 of a second level voltage may be supplied to the fourth gate line GL4. The first gate signal GW, the third gate signal GC, and the fifth gate signal EM2 may be supplied as a first level voltage. The fourth transistor T4 may be turned on in response to the second gate signal GI, the fifth transistor T5 may be turned on in response to the fourth gate signal EM1, and the tenth transistor T10 and the eleventh transistor T11 may be turned on in response to the fifth gate signal EM2. Thus, the gate of the first transistor T1 may be initialized as the first initialization voltage VINT.

During the first period P1, a change in the voltage-current characteristic of the first transistor T1 may be compensated for. The eighth transistor T8 may be turned off in response to the fourth gate signal EM1 of the second level voltage. However, the first initialization voltage VINT may be supplied to the gate of the first transistor T1, and the gate-source voltage Vgs of the first transistor T1 may be changed so that the first transistor T1 may be controlled in an on bias state. Thus, the first period P1, which is an initialization period, may also serve as a biasing period for compensating for a change in the voltage-current characteristic of the first transistor T1.

The second period P2 may be a compensation period in which the threshold voltage of the first transistor T1 is compensated for. During the second period P2, the third gate signal GC of a second level voltage may be supplied to the third gate line GL3, and the fourth gate signal EM1 of a second level voltage may be supplied to the fourth gate line GL4. The first gate signal GW, the second gate signal GI, and the fifth gate signal EM2 may be supplied as the first level voltage. The third transistor T3 and the ninth transistor T9 may be turned on in response to the third gate signal GC, the fifth transistor T5 may be turned on in response to the fourth gate signal EM1, and the tenth transistor T10 and the eleventh transistor T11 may be turned on in response to the fifth gate signal EM2. Thus, a voltage corresponding to the threshold voltage Vth of the first transistor T1 may be charged in the first capacitor C1.

The first period P1 and the second period P2 may be alternately repeated multiple times. FIG. 9 illustrates an example in which the first period P1 and the second period P2 are alternately repeated three times.

A third period P3 may be a data writing period (a data programming period). During the third period P3, the first gate signal GW of a second level voltage may be supplied to the first gate line GL1, and the fourth gate signal EM1 of a second level voltage may be supplied to the fourth gate line GL4. The second gate signal GI, the third gate signal GC, and the fifth gate signal EM2 may be supplied as the first level voltage. The second transistor T2 and the seventh transistor T7 may be turned on in response to the first gate signal GW, the fifth transistor T5 may be turned on in response to the fourth gate signal EM1, and the tenth transistor T10 and the eleventh transistor T11 may be turned on in response to the fifth gate signal EM2. Thus, the threshold voltage Vth of the first transistor T1 and a data voltage VDATA corresponding to the data signal DATA may be charged in the first capacitor C1. The third node N3, i.e., a pixel electrode of the organic light-emitting diode OLED may be initialized with the second initialization voltage AINT by the turned on seventh transistor T7.

The fourth period P4 may be a first biasing period in which the first transistor T1 is controlled in an on bias state. During the fourth period P4, the fourth gate signal EM1 of the first level voltage may be supplied to the fourth gate line GL4, and the fifth gate signal EM2 of a first level voltage may be supplied to the fifth gate line GL5. The first gate signal GW, the second gate signal GI, and the third gate signal GC may be supplied as the first level voltage. The fifth transistor T5 may be turned off in response to the fourth gate signal EM1, and the eighth transistor T8 may be turned on. The sixth transistor T6 may be turned off in response to the fifth gate signal EM2. Through the turned on eighth transistor T8, the fifth gate signal EM2 of a first level voltage may be supplied to the second node N2 so that the first transistor T1 may be controlled in an on bias state.

The fifth period P5 may be a second biasing period in which the first transistor T1 is controlled in an off-bias state. During the fifth period P5, a bias voltage may be supplied to a first terminal (source) of the first transistor T1, and the first transistor T1 may be controlled in an off-bias state. The off-bias state of the first transistor T1 may be a state in which the gate-source voltage Vgs of the first transistor T1 is controlled with a black grayscale voltage and a drain-source current Ids of the first transistor T1 corresponds to the black grayscale. The drain-source current Ids corresponding to the black grayscale may be the smallest current.

During the fifth period P5, the fourth gate signal EM1 of the first level voltage may be supplied to the fourth gate line GL4, and the fifth gate signal EM2 of a second level voltage may be supplied to the fifth gate line GL5. The first gate signal GW, the second gate signal GI, and the third gate signal GC may be supplied as the first level voltage. The fifth transistor T5 may be turned off in response to the fourth gate signal EM1, and the eighth transistor T8 may be turned on. The sixth transistor T6 may be turned on in response to the fifth gate signal EM2. Through the turned on eighth transistor T8, the fifth gate signal EM2 of a second level voltage may be supplied to the second node N2 so that the first transistor T1 may be controlled in an off-bias state. The sixth transistor T6 may be turned on so that the drain-source current Ids outputted by the first transistor T1 may be supplied to the organic light-emitting diode OLED. However, the organic light-emitting diode OLED may emit light with luminance corresponding to black by the drain-source current Ids corresponding to the black grayscale, and the organic light-emitting diode OLED may be in a state similar to the non-emission state of the organic light-emitting diode OLED. Thus, the fifth period P5 may be understood as a non-emission period.

During the first emission period DD1, the organic light-emitting diode OLED may emit light. During the first emission period DD1, the fourth gate signal EM1 and the fifth gate signal EM2 may be supplied as the second level voltage. The first gate signal GW, the second gate signal GI, and the third gate signal GC may be supplied as the first level voltage. The fifth transistor T5 and the sixth transistor T6 may be turned on in response to the fourth gate signal EM1 and the fifth gate signal EM2, and the first transistor T1 may output a driving current having a magnitude corresponding to the data voltage VDATA, and the organic light-emitting diode OLED may emit light with luminance corresponding to the magnitude of the driving current Id.

Referring to FIG. 10, the second scan period SS may include a second non-emission period ND2 and a second emission period DD2, and the second non-emission period ND2 may include a sixth period P6 and a seventh period P7. The second scan period SS may not include periods that correspond to the first period P1 and the second period P2 of the first scan period DS.

The second gate signal GI and the third gate signal GC may be supplied as a second level voltage during the second non-emission period ND2 and the second emission period DD2. The fourth gate signal EM1 may be supplied as the first level voltage during the sixth period P6 and the seventh period P7 and may be supplied as the second level voltage during other periods. The fifth gate signal EM2 may be supplied as the second level voltage during the sixth period P6 and the second period DD2 and may be supplied as the first level voltage during other periods.

The seventh period P7 may be a biasing period corresponding to the fourth period P4 of the first scan period DS. The fourth gate signal EM1 and the fifth gate signal EM2 may be supplied as the first level voltage during the seventh period P7 so that the fifth transistor T5 and the sixth transistor T6 may be turned off, and the eighth transistor T8 may be turned on so that a first level voltage of the fifth gate signal EM2 may be supplied to the second node N2 and the first transistor T1 may be controlled in an on bias state. A fourth period P4 of the first scan period DS may follow the third period P3, while the seventh period P7 may precede the sixth period P6.

In a sixth period P6, the first gate signal GW may be supplied as a second level voltage so that the seventh transistor T7 may be turned on. Thus, the pixel electrode of the organic light-emitting diode OLED may be initialized to the second initialization voltage AINT. The second transistor T2 may be turned on in response to the first gate signal GW, however, a data signal may not be supplied to the data line DL. The eighth transistor T8 may be turned on by the fourth gate signal EM1 of the first level voltage in the sixth period P6 so that the second level voltage of the fifth gate signal EM2 may be applied to the second node N2. Because the tenth transistor T10 and the eleventh transistor T11 are turned off, the first transistor T1 may be controlled in an off-bias state. For example, the sixth period P6 may be a period during which the pixel electrode of the organic light-emitting diode OLED is initialized and may be a second biasing period in which an off-bias is applied to the driving transistor.

Figure 11:
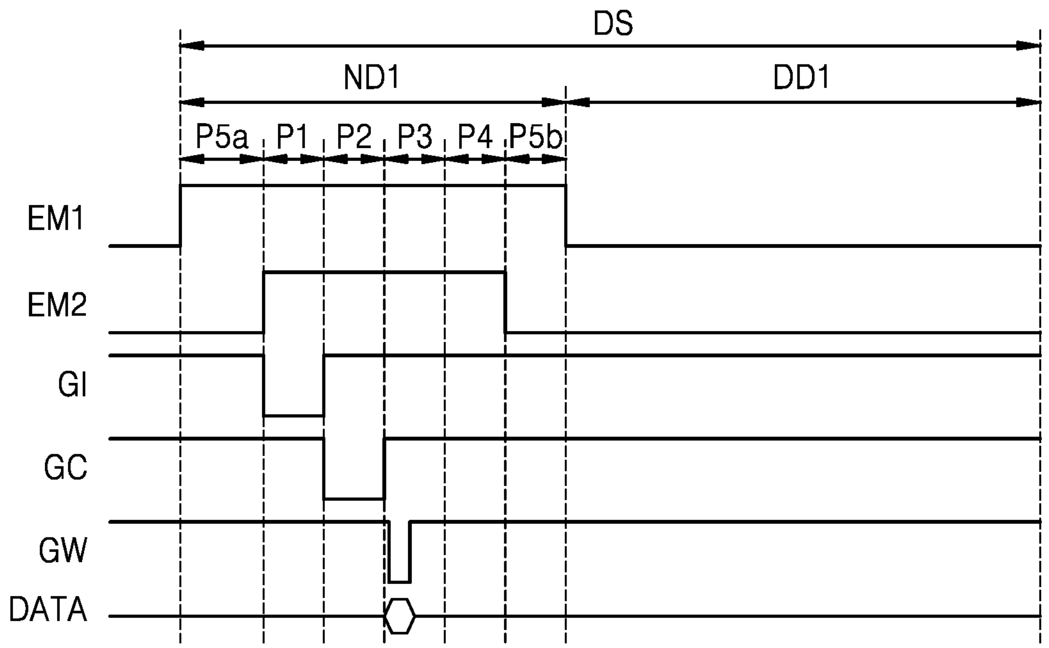
FIGS. 11 and 12 are schematic waveform diagrams for explaining an operation of a pixel according to an embodiment.
Figure 12:
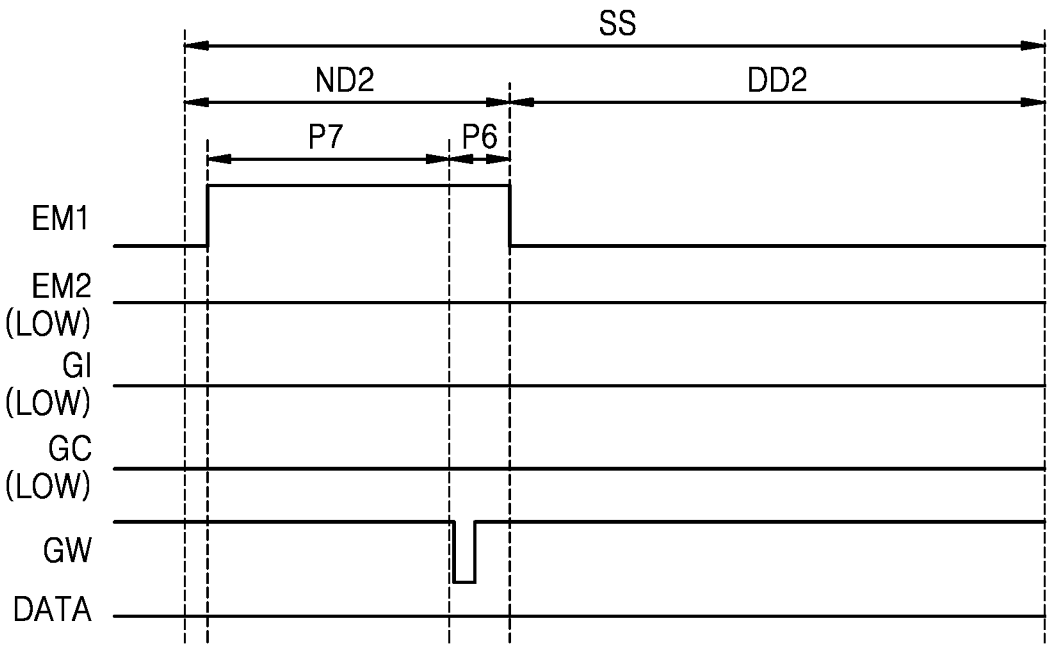

FIGS. 11 and 12 are schematic waveform diagrams for explaining an operation of a pixel according to an embodiment. FIG. 11 is a waveform diagram of signals applied to the pixel PX2 of FIG. 8 during a first scan period. FIG. 12 is a waveform diagram of signals applied to the pixel PX2 of FIG. 8 during a second scan period.

Referring to FIG. 11, a first scan period DS may include a first non-emission period ND1 and a first emission period DD1. The first non-emission period ND1 may include first through fifth periods P1 to P4, P5*a*, and P5*b*. In the waveform diagrams of FIGS. 11 and 12, timings of the fourth gate signal EM1 and the fifth gate signal EM2 may be different from each other compared to the waveform diagrams of FIGS. 9 and 10. Hereinafter, differences between FIGS. 11 and 12 and FIGS. 9 and 10 will be described.

The first period P1 may be an initialization period in which the gate of the first transistor T1 is initialized. In the first period P1, the second gate signal GI of a second level voltage may be supplied to the second gate line GL2. The first gate signal GW, the third gate signal GC, the fourth gate signal EM1, and the fifth gate signal EM2 may be supplied as the first level voltage. The fourth transistor T4 may be turned on in response to the second gate signal GI, the eighth transistor T8 may be turned on in response to the fourth gate signal EM1, and the tenth transistor T10 and the eleventh transistor T11 may be turned on in response to the fifth gate signal EM2. By the fourth transistor T4 and the eleventh transistor T11 that are turned on, the gate of the first transistor T1 may be initialized as the first initialization voltage VINT. By the turned on fifth transistor T5, the first driving voltage ELVDD may be supplied to the second node N2 to which the first terminal of the first transistor T1 is connected, and the first initialization voltage VINT may be supplied to the gate of the first transistor T1 so that the first transistor T1 may be controlled in an on-bias state.

The second period P2 may be a compensation period in which the threshold voltage of the first transistor T1 is compensated for. In the second period P2, the third gate signal GC of a second level voltage may be supplied to the third gate line GL3. The first gate signal GW, the second gate signal GI, the fourth gate signal EM1, and the fifth gate signal EM2 may be supplied as the first level voltage. The third transistor T3 and the ninth transistor T9 may be turned on in response to the third gate signal GC, the eighth transistor T8 may be turned on in response to the fourth gate signal EM1, and the tenth transistor T10 and the eleventh transistor T11 may be turned on in response to the fifth gate signal EM2. Thus, the first driving voltage ELVDD may be supplied to the second node N2, the reference voltage VREF may be supplied to the fifth node N5 electrically connected to the sixth node N6, and the first transistor T1 may be diode-connected so that the threshold voltage Vth of the first transistor T1 may be compensated for.

The first period P1 and the second period P2 may be alternately repeated multiple times. FIG. 11 illustrates an example in which the first period P1 and the second period P2 are alternately repeated twice.

A third period P3 may be a data writing period (a data programming period). In the third period P3, the first gate signal GW of a second level voltage may be supplied to the first gate line GL1. The second gate signal GI, the third gate signal GC, the fourth gate signal EM1, and the fifth gate signal EM2 may be supplied as the first level voltage. The second transistor T2 and the seventh transistor T7 may be turned on in response to the first gate signal GW, the eighth transistor T8 may be turned on in response to the fourth gate signal EM1, and the tenth transistor T10 and the eleventh transistor T11 may be turned on in response to the fifth gate signal EM2. By the second transistor T2 and the tenth transistor T10 that are turned on, the threshold voltage Vth of the first transistor T1 and the data voltage DATA corresponding to the data signal DATA may be charged in the first capacitor C1. The third node N3, i.e., a pixel electrode of the organic light-emitting diode OLED may be initialized with the second initialization voltage AINT by the turned on seventh transistor T7.

The fourth period P4 may be a first biasing period in which the first transistor T1 is controlled in an on bias state. During the fourth period P4, the fourth gate signal EM1 of the first level voltage may be supplied to the fourth gate line GL4, and the fifth gate signal EM2 of a first level voltage may be supplied to the fifth gate line GL5. The first gate signal GW, the second gate signal GI, and the third gate signal GC may be supplied as the first level voltage. The fifth transistor T5 may be turned off in response to the fourth gate signal EM1, and the eighth transistor T8 may be turned on. The sixth transistor T6 may be turned off in response to the fifth gate signal EM2. Through the turned on eighth transistor T8, the fifth gate signal EM2 of a first level voltage may be supplied to the second node N2 so that the first transistor T1 may be controlled in an on bias state.

The fifth period P5 may be a second biasing period in which the first transistor T1 is controlled in an off-bias state. The fifth period P5 may include a (2-1)-th biasing period P5*a* and a (2-2)-th biasing period P5*b*. A fourth gate signal EM1 of the first level voltage may be supplied to the fourth gate line GL4 and a fifth gate signal EM2 of the second level voltage may be supplied to the fifth gate line GL5 in the (2-1)-th biasing period P5*a* and the (2-2)-th biasing period P5*b*, respectively. The first gate signal GW, the second gate signal GI, and the third gate signal GC may be supplied as the first level voltage. The fifth transistor T5 may be turned off in response to the fourth gate signal EM1, and the eighth transistor T8 may be turned on. The sixth transistor T6 may be turned on in response to the fifth gate signal EM2. Through the turned on eighth transistor T8, the fifth gate signal EM2 of a second level voltage may be supplied to the second node N2 so that the first transistor T1 may be controlled in an off-bias state. The (2-1)-th biasing period P5*a* may precede the first period P1, and the (2-2)-th biasing period P5*b* may follow the fourth period P4 which is the first biasing period.

During the first emission period DD1, the fourth gate signal EM1 and the fifth gate signal EM2 may be supplied as the second level voltage. The first gate signal GW, the second gate signal GI, and the third gate signal GC may be supplied as the first level voltage. In the first emission period DD1, the organic light-emitting diode OLED may emit light with luminance corresponding to the magnitude of the driving current Id.

Referring to FIG. 12, the second scan period SS may include a second non-emission period ND2 and a second emission period DD2, and the second non-emission period ND2 may include a sixth period P6 and a seventh period P7. The second scan period SS may not include periods that correspond to the first period P1 and the second period P2 of the first scan period DS.

The second gate signal GI, the third gate signal GC, and the fifth gate signal EM2 may be supplied as a second level voltage during the second non-emission period ND2 and the second emission period DD2. The fourth gate signal EM1 may be supplied as the first level voltage during the sixth period P6 and the seventh period P7 and may be supplied as the second level voltage during other periods.

The seventh period P7 may be a second biasing period corresponding to the fifth period P5 of the first scan period DS. The fourth gate signal EM1 may be supplied as a first level voltage in the seventh period P7 so that the fifth transistor T5 may be turned off and the eighth transistor T8 may be turned on and thus, the second level voltage of the fifth gate signal EM2 may be supplied to the second node N2 and the first transistor T1 may be controlled in an off-bias state.

In a sixth period P6, the first gate signal GW may be supplied as a second level voltage so that the seventh transistor T7 may be turned on. Thus, the pixel electrode of the organic light-emitting diode OLED may be initialized to the second initialization voltage AINT. The second transistor T2 may be turned on in response to the first gate signal GW, however, a data signal may not be supplied to the data line DL. The eighth transistor T8 may be turned on by the fourth gate signal EM1 of the first level voltage in the sixth period P6 so that the second level voltage of the fifth gate signal EM2 may be applied to the second node N2. Because the tenth transistor T10 and the eleventh transistor T11 are turned off, the first transistor T1 may be controlled in an off-bias state. For example, the sixth period P6 may be an initialization period during which the pixel electrode of the organic light-emitting diode OLED is initialized and may be a second biasing period in which the driving transistor is controlled in an off-bias state.

In an embodiment, the first through fifth gate signals GW, GI, GC, EM1, and EM2 may be respectively supplied to the first through fifth gate lines GL1 to GL5 of each pixel row at a certain timing. In another embodiment, the first gate signal GW may be sequentially supplied to the first gate line GL1 of each pixel row at a certain timing, and the second through fifth gate signals GI, GC, EM1, and EM2 may be simultaneously supplied to the second through fifth gate lines GL2 to GL5 of two pixel rows and may be sequentially supplied in the unit of two pixel rows. Thus, high-speed driving of the display apparatus may be readily implemented.

Figure 13:
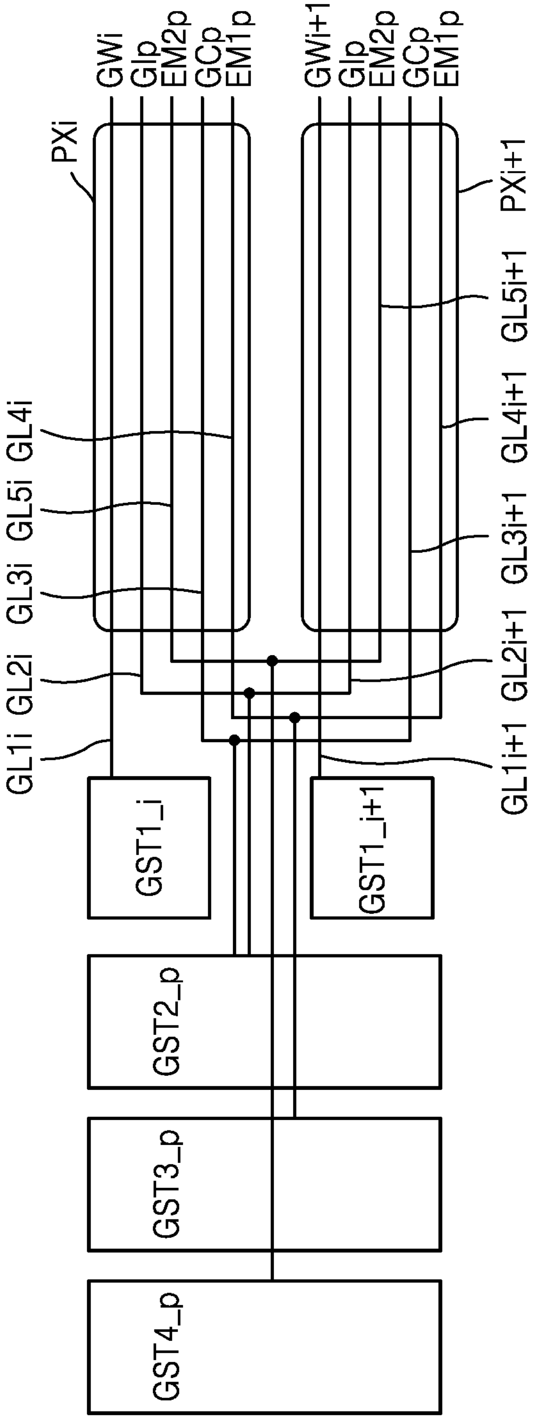
FIGS. 13 and 14 are views for schematically explaining gate lines and gate signals to be supplied to the gate lines of pixels illustrated in FIG. 7.
Figure 14:
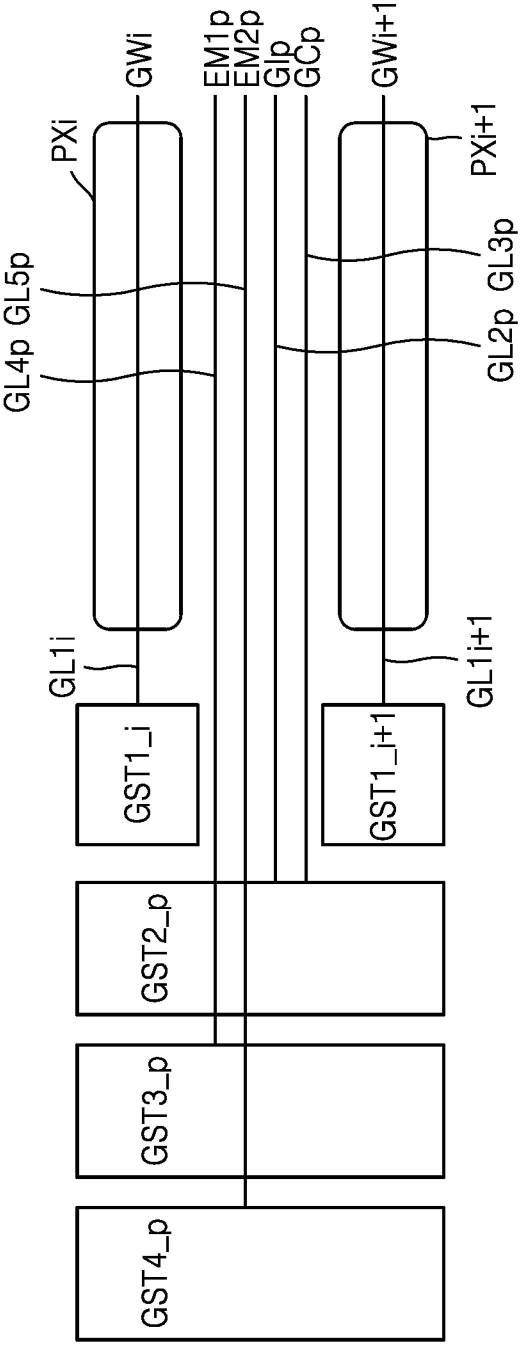

FIGS. 13 and 14 are views for schematically explaining gate lines and gate signals to supplied to the gate lines of pixels illustrated in FIG. 7.

In an embodiment, as shown in FIG. 13, an i-th pixel PXi located in an i-th pixel row (an i-th horizontal line) and an (i+1)-th pixel (PXi+1) located in an (i+1)-th pixel row (an (i+1)-th horizontal line) may have substantially the same pixel structure. An example in which the i-th pixel PXi and the (i+1)-th pixel (PXi+1) are connected to a m-th data line, will be described below.

An i-th first stage GST1_*i* included in a first gate driving circuit of the gate driving circuit 130B may be connected to an i-th first gate line GL1*i* arranged in the i-th pixel row PXLi. An (i+1)-th stage (GST1_*i*+1) included in the (i+1)-th first gate driving circuit may be connected to an (i+1)-th first gate line (GL1*i*+1) arranged in the (i+1)-th pixel row (PXLi+1). The i-th first stage GST1_*i* may supply an i-th first gate signal GWi to an i-th first gate line GL1*i*. The (i+1)-th stage (GST1_*i*+1) may supply an (i+1)-th first gate signal (GWi+1) to an (i+1)-th first gate line (GL1*i*+1). The (i+1)-th first gate signal (GWi+1) may be a gate signal in which the i-th first gate signal GWi is shifted (delayed) by 1 horizontal period.

A p-th (where p is a natural number) second stage GST2_*p* included in a second gate driving circuit of the gate driving circuit 130B may be connected to the i-th second gate line GL2*i* arranged in the i-th pixel row PXLi and the (i+1)-th second gate line (GL2*i*+1) arranged in the (i+1)-th pixel row (PXLi+1). The p-th second stage GST2_*p* may simultaneously supply the p-th second gate signal Glp to the i-th second gate line GL2*i* and the (i+1)-th second gate line (GL2i+1). For example, the i-th pixel PXi and the (i+1)-th pixel (PXi+1) may be commonly controlled by the same second gate signal Glp.

The p-th second stage GST2_p included in the second gate driving circuit of the gate driving circuit 1308 may be connected to the i-th third gate line GL3i arranged in the i-th pixel row PXLi and the (i+1)-th third gate line (GL3i+1) arranged in the (i+1)-th pixel row (PXLi+1). The p-th second stage GST2_p may simultaneously supply the p-th third gate signal GCp to the i-th third gate line GL3i and the (i+1)-th third gate line (GL3i+1). For example, the i-th pixel PXi and the (i+1)-th pixel (PXi+1) may be commonly controlled by the same third gate signal GCp.

The p-th third stage GST3_p included in the third gate driving circuit of the gate driving circuit 130B may be connected to the i-th fourth gate line GL4i arranged in the i-th pixel row PXLi and the (i+1)-th fourth gate line (GL4i+1) arranged in the (i+1)-th pixel row (PXLi+1). The p-th third stage GST3_p may simultaneously supply the p-th fourth gate signal EM1p to the i-th fourth gate line GL4i and the (i+1)-th fourth gate line (GL4i+1). For example, the i-th pixel PXi and the (i+1)-th pixel (PXi+1) may be commonly controlled by the same fourth gate signal EM1p.

The p-th third stage GST4_p included in the fourth gate driving circuit of the gate driving circuit 130B may be connected to the i-th fifth gate line GL5i arranged in the i-th pixel row PXLi and the (i+1)-th fifth gate line (GL5i+1) arranged in the (i+1)-th pixel row (PXLi+1). The p-th fourth stage GST4_p may simultaneously supply the p-th fifth gate signal EM2p to the i-th fifth gate line GL5i and the (i+1)-th fifth gate line (GL5i+1). For example, the i-th pixel PXi and the (i+1)-th pixel (PXi+1) may be commonly controlled by the same fifth gate signal EM2p.

In another embodiment, as shown in FIG. 14, the i-th pixel PXi and the (i+1)-th pixel (PXi+1) may have a vertically symmetrical structure. The i-th pixel PXi and the (i+1)-th pixel (PXi+1) may share some circuit elements and signal lines.

An i-th first stage GST1_i included in a first gate driving circuit of the gate driving circuit 1308 may be connected to an i-th first gate line GL1i arranged in the i-th pixel row PXLi. An (i+1)-th first stage (GST1_i+1) included in the first gate driving circuit may be connected to an (i+1)-th first gate line (GL1i+1) arranged in the (i+1)-th pixel row (PXLi+1). The i-th first stage GST1_i may supply an i-th first gate signal GWi to an i-th first gate line GL1i. The (i+1)-th first stage (GST1_i+1) may supply an (i+1)-th first gate signal (GWi+1) to an (i+1)-th first gate line (GL1i+1).

The p-th second stage GST2_p included in the second gate driving circuit of the gate driving circuit 130B may be connected to the p-th second gate line GL2p arranged between the i-th pixel PXi and the (i+1)-th pixel (PXi+1) and shared by the i-th pixel PXi and the (i+1)-th pixel (PXi+1). The p-th second stage GST2_p may supply a p-th second gate signal Glp to a p-th second gate line GL2p. For example, the i-th pixel PXi and the (i+1)-th pixel (PXi+1) may be commonly controlled by the same second gate signal Glp.

The p-th second stage GST2_p included in the second gate driving circuit of the gate driving circuit 130B may be connected to the p-th third gate line GL3p arranged between the i-th pixel PXi and the (i+1)-th pixel (PXi+1) and shared by the i-th pixel PXi and the (i+1)-th pixel (PXi+1). The p-th second stage GST2_p may supply a p-th third gate signal GCp to a p-th third gate line GL3p. For example, the i-th pixel PXi and the (i+1)-th pixel (PXi+1) may be commonly controlled by the same third gate signal GCp.

The p-th third stage GST3_p included in the third gate driving circuit of the gate driving circuit 1308 may be connected to the p-th fourth gate line GL4p arranged between the i-th pixel PXi and the (i+1)-th pixel (PXi+1) and shared by the i-th pixel PXi and the (i+1)-th pixel (PXi+1). The p-th third stage GST3_p may supply a p-th fourth gate signal EM1p to a p-th fourth gate line GL4p. For example, the i-th pixel PXi and the (i+1)-th pixel (PXi+1) may be commonly controlled by the same fourth gate signal EM1p.

The p-th fourth stage GST4_p included in the fourth gate driving circuit of the gate driving circuit 130B may be connected to the p-th fifth gate line GL5p arranged between the i-th pixel PXi and the (i+1)-th pixel (PXi+1) and shared by the i-th pixel PXi and the (i+1)-th pixel (PXi+1). The p-th fourth stage GST4_p may supply a p-th fifth gate signal EM2p to a p-th fifth gate line GL5p. For example, the i-th pixel PXi and the (i+1)-th pixel (PXi+1) may be commonly controlled by the same fifth gate signal EM2p.

Figure 15:
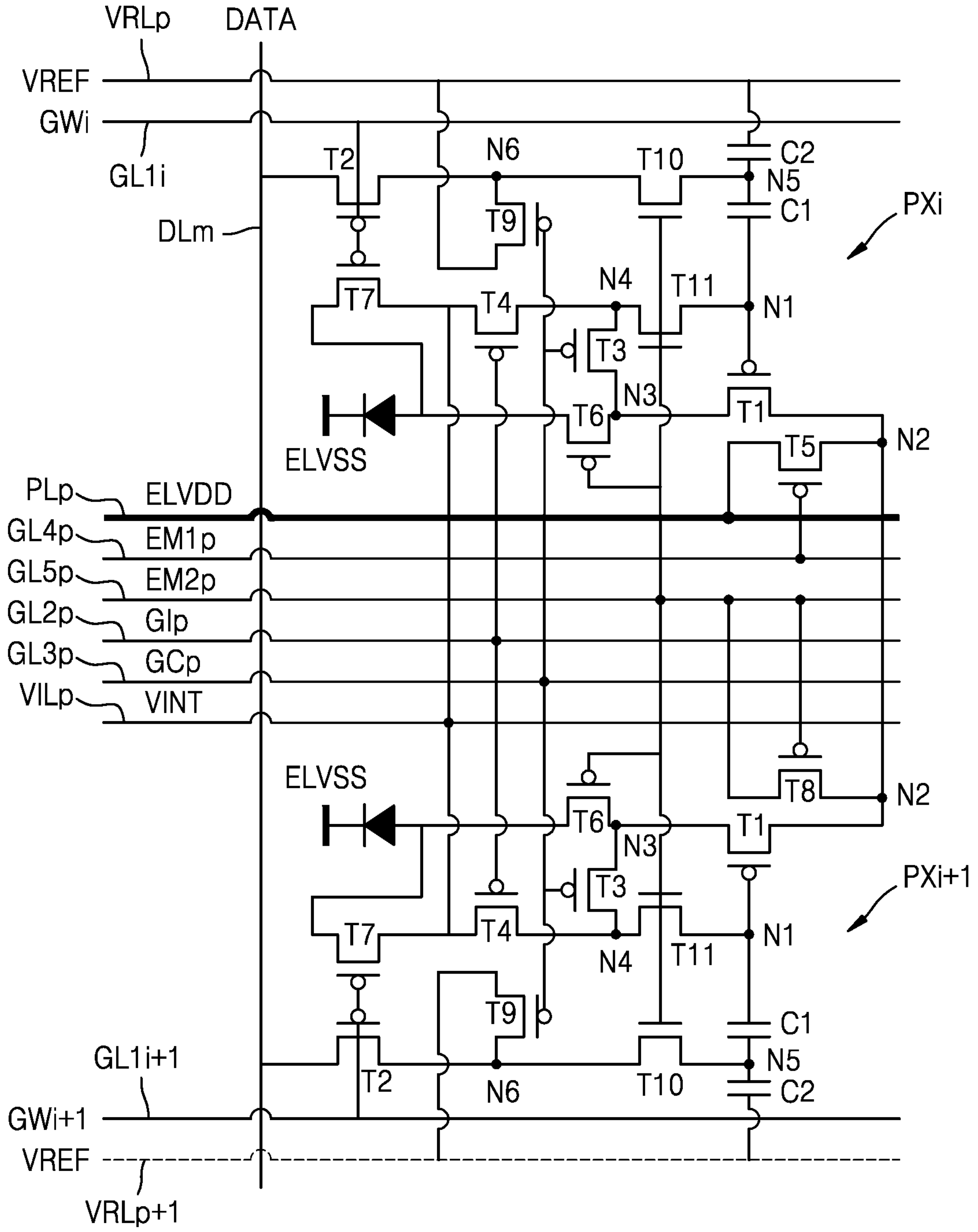
FIGS. 15 and 16 are schematic circuit diagrams of pixels according to an embodiment.
Figure 16:
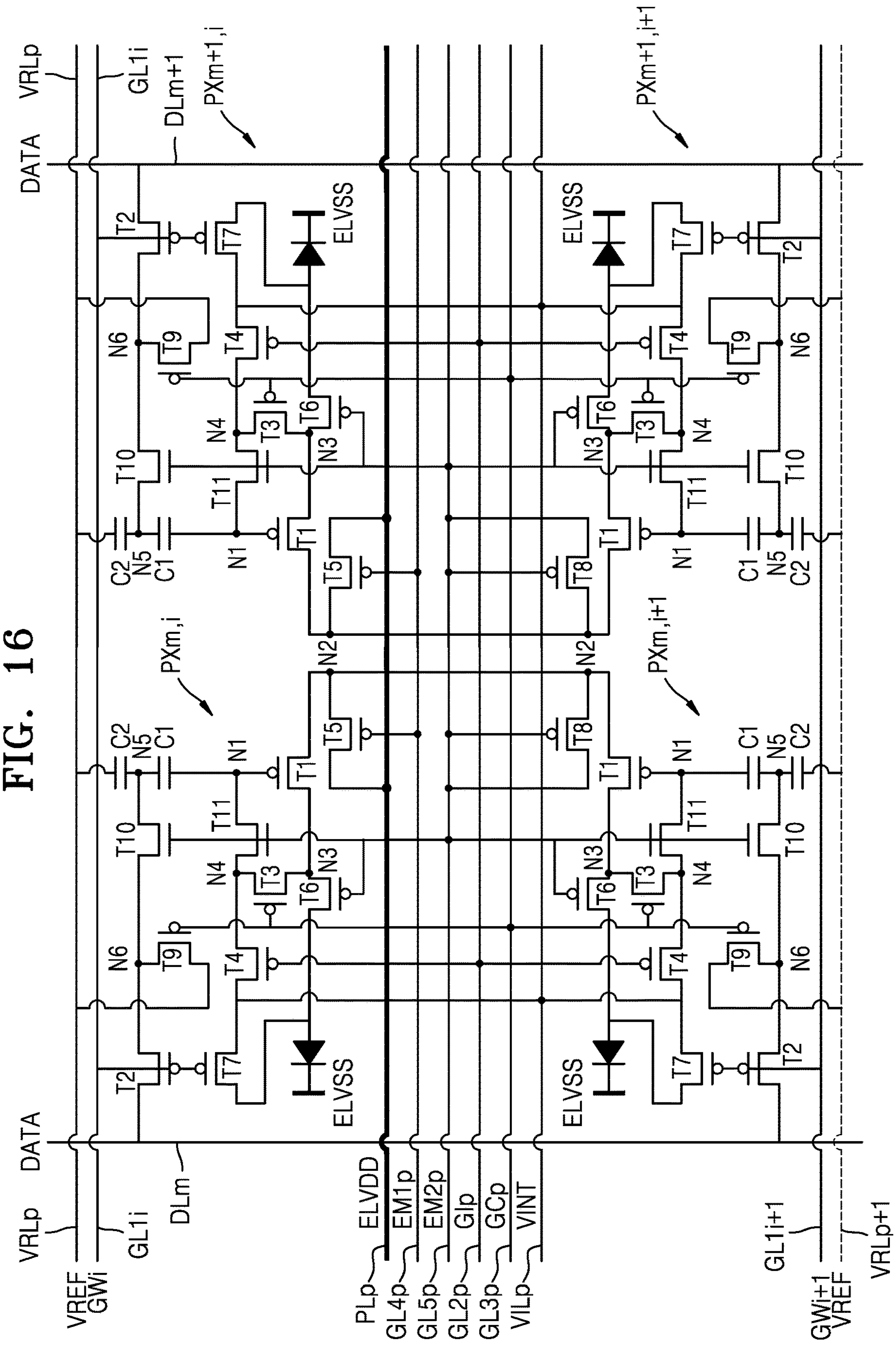

FIGS. 15 and 16 are schematic circuit diagrams of pixels according to an embodiment.

A pixel circuit shown in FIGS. 15 and 16 is the same as or similar to the pixel circuit of FIG. 8 except for a connection of the fourth transistor T4, the fifth transistor T5, the seventh transistor T7, the eighth transistor T8, and the second capacitor C2, and thus, same reference numerals are used for same or corresponding elements, and a redundant description thereof is omitted.

In an embodiment, as shown in FIG. 15, the i-th pixel PXi and the (i+1)-th pixel (PXi+1) may have a vertically symmetrical structure. The i-th pixel PXi and the (i+1)-th pixel (PXi+1) may include first through fourth transistors T1 to T4, a sixth transistor T6, a seventh transistor T7, ninth to eleventh transistors T9 to T11, and first and second capacitors C1 and C2.

The i-th pixel PXi may be connected to the i-th first gate line GL1i arranged in the i-th pixel row. A gate of the second transistor T2 and a gate of the seventh transistor T7 of the i-th pixel PXi may be connected to the i-th first gate line GL1i. The (i+1)-th pixel (PXi+1) may be connected to the (i+1)-th first gate line (GL1i+1) arranged in the (i+1)-th pixel row. The gate of the second transistor T2 and the gate of the seventh transistor T7 of the (i+1)-th pixel (PXi+1) may be connected to the (i+1)-th first gate line (GL1i+1). The i-th first gate signal GWi may be supplied to the i-th first gate line GL1i, and the (i+1)-th first gate signal (GWi+1) may be supplied to the (i+1)-th first gate line (GL1i+1).

The i-th pixel PXi and the (i+1)-th pixel (PXi+1) may share a p-th driving voltage line PLp and a p-th initialization voltage line VILp arranged between the i-th pixel PXi and the (i+1)-th pixel (PXi+1). A first driving voltage ELVDD may be supplied to the p-th driving voltage line PLp, and the initialization voltage VINT may be supplied to the p-th initialization voltage line VILp.

The i-th pixel PXi may share the p-th reference voltage line VRLp arranged between the i-th pixel PXi and the (i−1)-th pixel (PXi−1)(not shown) with the (i−1)-th pixel (PXi−1)(not shown). The (i+1)-th pixel (PXi+1) may share a (p+1)-th reference voltage line VRLp+1 arranged between the (i+1)-th pixel (PXi+1) and the (i+2)-th pixel (PXi+2) with the (i+2)-th pixel (PXi+2). The reference voltage VREF may be supplied to the p-th reference voltage line VRLp and the (p+1)-th reference voltage line (VRLp+1). The second capacitor C2 of the i-th pixel PXi may be connected between the fifth node N5 of the i-th pixel row PXi and the p-th reference voltage line VRLp. The second capacitor C2 of the (i+1)-th pixel (PXi+1) may be connected between the fifth node N5 of the (i+1)-th pixel (PXi+1) and the (p+1)-th reference voltage line VRLp+1.

The i-th pixel PXi and the (i+1)-th pixel (PXi+1) may share the fifth transistor T5 and the eighth transistor T8. The fifth transistor T5 may include a gate connected to the p-th fourth gate line GL4*p*, a first terminal connected to the p-th driving voltage line PLp, and a second terminal connected to the second node N2. The eighth transistor T8 may include a gate connected to the p-th fifth gate line GL5*p*, a first terminal connected to the second node N2, and a second terminal connected to the p-th fifth gate line GL5*p*.

The i-th pixel PXi and the (i+1)-th pixel (PXi+1) may share a p-th second gate line GL2*p* arranged between the i-th pixel PXi and the (i+1)-th pixel (PXi+1). The i-th pixel PXi and the (i+1)-th pixel (PXi+1) may be connected to the p-th second gate line GL2*p*. The p-th second gate signal Glp may be supplied to the p-th second gate line GL2*p*, and the i-th pixel PXi and the (i+1)-th pixel (PXi+1) may be commonly controlled by the same second gate signal Glp.

The i-th pixel PXi and the (i+1)-th pixel (PXi+1) may share a p-th third gate line GL3*p* arranged between the i-th pixel PXi and the (i+1)-th pixel (PXi+1). The i-th pixel PXi and the (i+1)-th pixel (PXi+1) may be connected to the p-th third gate line GL3*p*. The p-th third gate signal GCp may be supplied to the p-th third gate line GL3*p*, and the i-th pixel PXi and the (i+1)-th pixel (PXi+1) may be commonly controlled by the same third gate signal GCp.

The i-th pixel PXi and the (i+1)-th pixel (PXi+1) may share a p-th fourth gate line GL4*p* arranged between the i-th pixel PXi and the (i+1)-th pixel (PXi+1). The i-th pixel PXi and the (i+1)-th pixel (PXi+1) may be connected to the p-th fourth gate line GL4*p*. The p-th fourth gate signal EM1*p* may be supplied to the p-th fourth gate line GL4*p*, and the i-th pixel PXi and the (i+1)-th pixel (PXi+1) may be commonly controlled by the same fourth gate signal EM1*p*.

The i-th pixel PXi and the (i+1)-th pixel (PXi+1) may share a p-th fifth gate line GL5*p* arranged between the i-th pixel PXi and the (i+1)-th pixel (PXi+1). The i-th pixel PXi and the (i+1)-th pixel (PXi+1) may be connected to the p-th fifth gate line GL5*p*. The p-th fifth gate signal EM2*p* may be supplied to the p-th fifth gate line GL5*p*, and the i-th pixel PXi and the (i+1)-th pixel (PXi+1) may be commonly controlled by the same fifth gate signal EM2*p*.

In an embodiment of FIG. 15, two pixels of two pixel rows have a vertically symmetrical structure, and some signal lines and circuit elements are shared. Embodiments of the disclosure are not limited thereto, and four pixels (two pairs of pixels having the vertically symmetrical structure) of four pixel rows in the same pixel column, and some signal lines and circuit elements may be shared.

In another embodiment, as shown in FIG. 16, a pair of pixels of adjacent pixel columns of the same pixel row may have a left and right symmetric structure, and some signal lines and circuit elements may be shared. FIG. 16 illustrates an i-th pixel (Pxm, i) and an (i+1)-th pixel (PXm,i+1) in a m-th pixel column and an i-th pixel (PXm+1,i) and an (i+1)-th pixel (PXm+1,i1) in a (m+1)-th pixel column. The i-th pixel (PXm,i) and the (i+1)-th pixel (PXm,i+1) in the m-th pixel column may have a vertically symmetrical structure, the i-th pixel (PXm+1,i) and the (i+1)-th pixel (PXm+1,i+1) in the (m+1)-th pixel column may have a vertically symmetrical structure, and the i-th pixel (PXm,i) and the i-th pixel (PXm+1,i) may have a left and right symmetrical structure, and the (i+1)-th pixel (PXm,i+1) and the (i+1)-th pixel (PXm+1,i+1) may have a left and right symmetrical structure.

Figure 17:
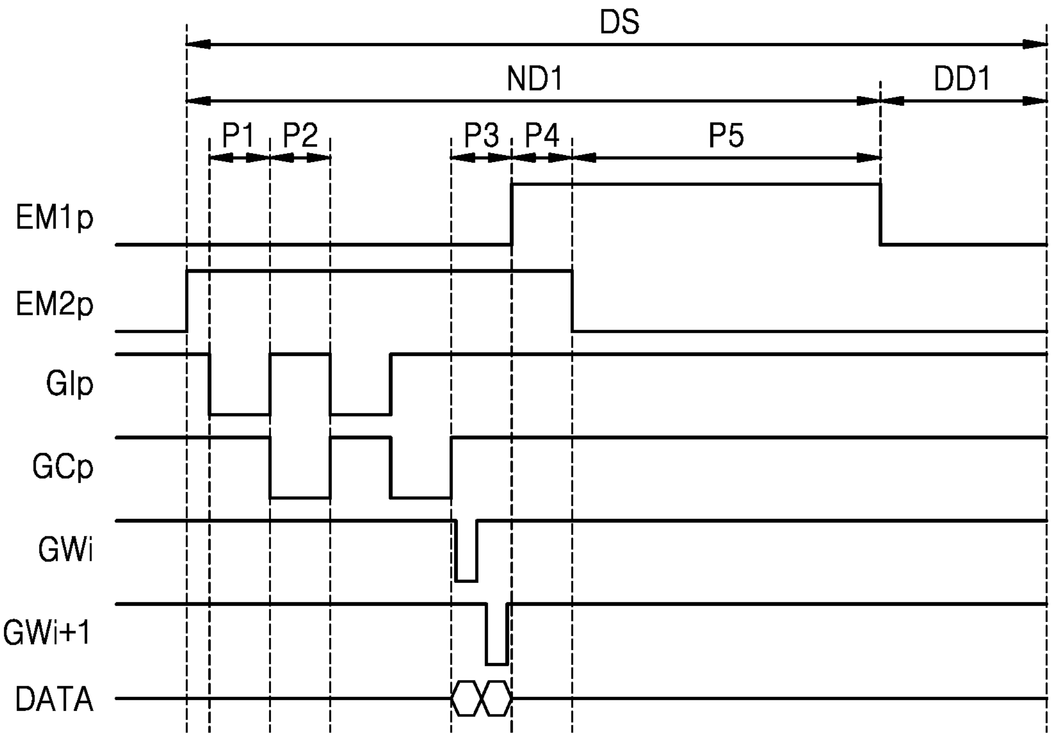
FIGS. 17 through 20 are schematic waveform diagrams for explaining an operation of a pixel according to an embodiment.
Figure 18:
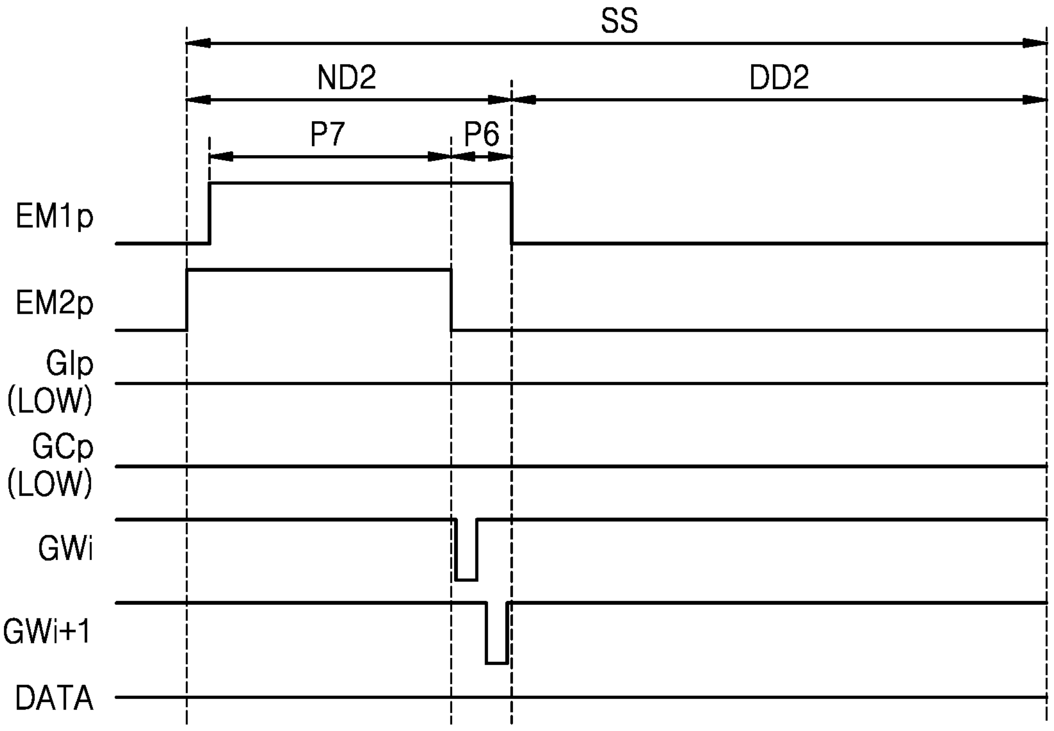
Figure 19:
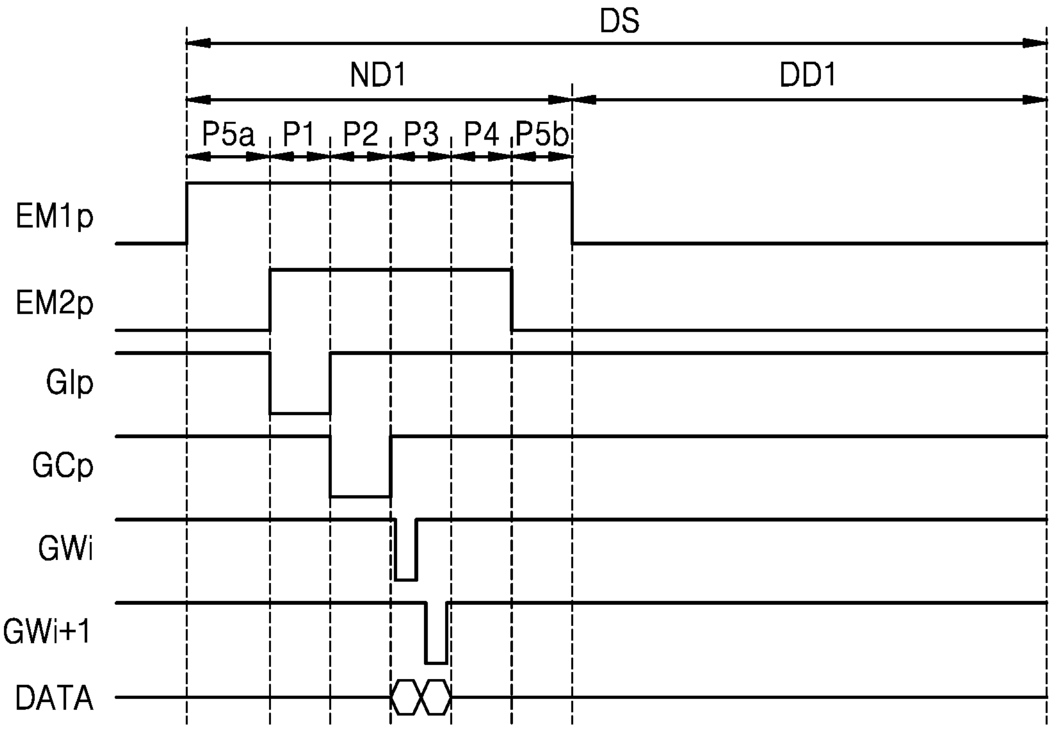
Figure 20:
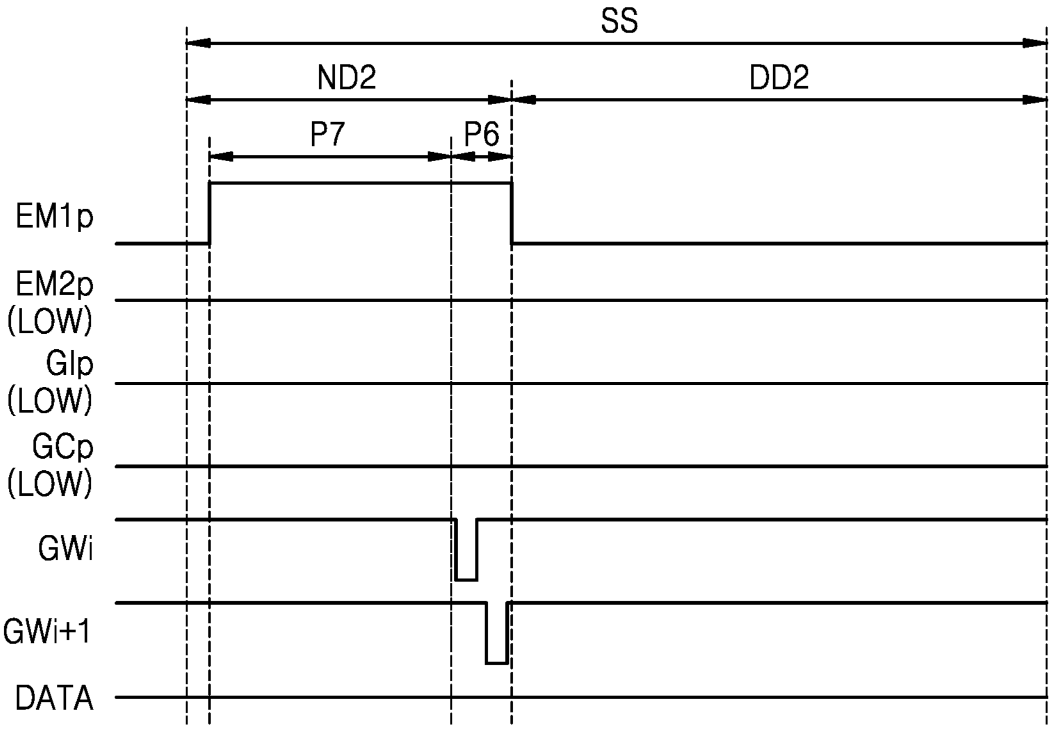

FIGS. 17 through 20 are schematic waveform diagrams for explaining an operation of a pixel according to an embodiment. FIGS. 17 and 19 are waveform diagrams of signals applied to the pixels of FIG. 15 during a first scan period. FIGS. 18 and 20 are waveform diagrams of signals applied to the pixels of FIG. 15 during a second scan period. The waveform diagrams of FIGS. 17 through 20 are respectively the same as or similar to the waveform diagrams of FIGS. 9 through 12 and thus, a redundant description thereof is omitted.

In an embodiment, as shown in FIG. 17, during the first scan period DS, an i-th first gate signal GWi and the (i+1)-th first gate signal (GWi+1) may be sequentially supplied as a second level voltage, and data signal (DATA) may be supplied in a third period P3. A p-th second gate signal Glp may be supplied as the second level voltage in a first period P1. A p-th third gate signal GCp may be supplied as the second level voltage in a second period P2. A p-th fourth gate signal EM1*p* may be supplied as the second level voltage in the first through third periods P1, P2, and P3 and a first emission period DD1. A p-th fifth gate signal EM2*p* may be supplied as the second level voltage in a fifth period P5 and the first emission period DD1.

As shown in FIG. 18, during the second scan period SS, an i-th first gate signal GWi and the (i+1)-th first gate signal (GWi+1) may be sequentially supplied as a second level voltage, and data signal (DATA) may not be supplied in a sixth period P6. The p-th second gate signal Glp and the p-th third gate signal GCp may be supplied as a second level voltage during the second non-emission period ND2 and the second emission period DD2. The p-th fourth gate signal EM1*p* may be supplied as the first level voltage during the sixth period P6 and the seventh period P7 and may be supplied as the second level voltage during other periods. The p-th fifth gate signal EM2*p* may be supplied as the second level voltage during the sixth period P6 and the second period DD2 and may be supplied as the first level voltage during other periods.

In an embodiment, as shown in FIG. 19, during the first scan period DS, an i-th first gate signal GWi and the (i+1)-th first gate signal (GWi+1) may be sequentially supplied as a second level voltage in the third period P3, and a data signal DATA may be supplied. A p-th second gate signal Glp may be supplied as the second level voltage in a first period P1. A p-th third gate signal GCp may be supplied as the second level voltage in a second period P2. The p-th fourth gate signal EM1*p* may be supplied as the first level voltage during the first non-emission period ND1 and may be supplied as the second level voltage during the first emission period DD1. The p-th fifth gate signal EM2*p* may be supplied as the first level voltage during the first through fourth periods P1, P2, P3, P4 and may be supplied as the second level voltage during other periods.

Referring to FIG. 20, during the second scan period SS, the i-th first gate signal GWi and the (i+1)-th first gate signal (GWi+1) may be sequentially supplied as the second level voltage in the sixth period P6 but the data signal DATA may not be supplied. The p-th second gate signal Glp, the p-th third gate signal GCp, and the p-th fifth gate signal EM2*p* may be supplied as the second level voltage in the second non-emission period ND2 and the second emission period DD2. The p-th fourth gate signal EM1*p* may be supplied as the first level voltage during the sixth period P6 and the seventh period P7 and may be supplied as the second level voltage during other periods.

Figure 21:
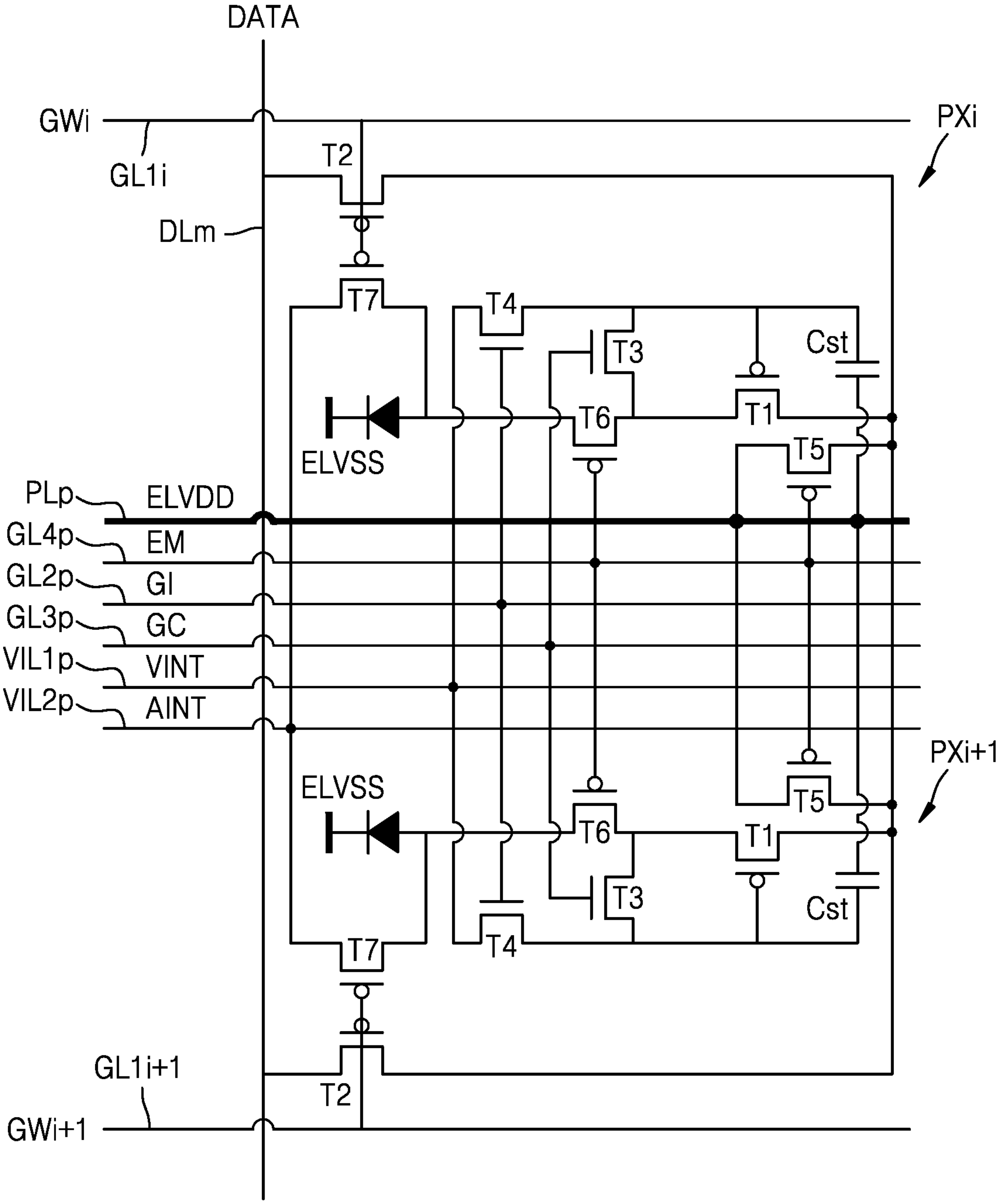
FIG. 21 is a schematic circuit diagram of pixels according to an embodiment.

FIG. 21 is a schematic circuit diagram of pixels according to an embodiment.

A pixel circuit according to the above-described embodiments includes first through eleventh transistors T1 through T11, a first capacitor C1, and a second capacitor C2. However, embodiments of the disclosure are not limited thereto.

In another embodiment, as shown in FIG. 21, the i-th pixel PXi and the (i+1)-th pixel (PXi+1) may have a vertically symmetrical structure. Each of the i-th pixel PXi and the (i+1)-th pixel (PXi+1) may include first through seventh transistors T1 through T7 and a capacitor Cst. The third transistor T3 and the fourth transistor T4 may be N-type oxide thin film transistors, and the other transistors may be P-type silicon thin film transistors. Hereinafter, different elements from the pixel circuit shown in FIGS. 15 and 20 will be described, and a redundant description thereof is omitted.

The i-th pixel PXi and the (i+1)-th pixel (PXi+1) may share a p-th driving voltage line PLp, a p-th first initialization voltage line VIL1*p*, a p-th second initialization voltage line VIL2*p*, a p-th second gate line GL2*p*, a p-th third gate line GL3*p*, and a p-th fourth gate line GL4*p*, arranged between the i-th pixel PXi and the (i+1)-th pixel (PXi+1).

The third transistor T3 may be connected between a second terminal and a gate of the first transistor T1. The third transistor T3 may include a gate connected to the p-th third gate line GL3*p*, a first terminal connected to the second terminal of the first transistor T1, and a second terminal connected to the gate of the first transistor T1.

The fourth transistor T4 may be connected between the gate of the first transistor T1 and the p-th first initialization voltage line VIL1*p*. The fourth transistor T4 may include a gate connected to the p-th second gate line GL2*p*, a first terminal connected to the gate of the first transistor T1, and a second terminal connected to the p-th first initialization voltage line VIL1*p*.

The seventh transistor T7 may be connected between the organic light-emitting diode OLED and the p-th second initialization voltage line VIL2*p*. The seventh transistor T7 of the i-th pixel PXi may include a gate connected to the i-th first gate line GL1*i*, a first terminal connected to the pixel electrode of the organic light-emitting diode OLED, and a second terminal connected to the p-th second initialization voltage line VIL2*p*. The seventh transistor T7 of the (i+1)-th pixel (PXi+1) may include a gate connected to the (i+1)-th first gate line (GL1*i*+1), a first terminal connected to the pixel electrode of the organic light-emitting diode OLED, and a second terminal connected to the p-th second initialization voltage line VIL2*p*.

The capacitor Cst may be connected between the gate of the first transistor T1 and the p-th driving voltage line PLp.

In another embodiment, the i-th pixel PXi and the (i+1)-th pixel (PXi+1) may share the fifth transistor T5.

According to embodiments of the disclosure, a signal applied to a gate of a bias control transistor (for example, an eighth transistor T8) is used as a signal applied to a gate of another switching transistor (for example, a fifth transistor T5 and a sixth transistor T6) so that the number and area of gate driving circuit may be reduced and thus a non-display area may be reduced.

According to embodiments of the disclosure, voltage levels and timings of gate signals (for example, a fourth gate signal EM1 and a fifth gate signal EM2) applied to gates of transistors (e.g., a fifth transistor T5 and a sixth transistor T6) disposed on a path through which a driving current flows may be controlled so that turn on/turn off of the bias control transistor and a voltage level applied to a source of the driving transistor (e.g., the first transistor T1) may be controlled and thus, a bias state of the driving transistor may be controlled. Thus, an afterimage phenomenon may be minimized by compensating for a change in a voltage-current characteristic according to a hysteresis characteristic of the driving transistor.

According to embodiments of the disclosure, upper and lower pixels may share some signal lines. The upper and lower pixels share signal lines (e.g., gate lines, a driving voltage line, an initialization voltage line, a reference voltage line, etc.) extending in a direction perpendicular to an extension direction of the data line to reduce an area overlapping the data line, thereby reducing capacitance formed between the data line and the signal lines so that deterioration of image quality may be minimized.

Figure 22:
FIG. 22 is a schematic cross-sectional view illustrating the structure of a display element according to an embodiment.

FIG. 22 is a schematic cross-sectional view illustrating the structure of a display element according to an embodiment. FIGS. 23A through 23D are schematic cross-sectional views illustrating the structure of a display element according to an embodiment.

Referring to FIG. 22, an organic light-emitting diode OLED as a display element according to an embodiment may include a pixel electrode 201, an opposite electrode 205, and an intermediate layer 203 between the pixel electrode 201 (a first electrode, an anode) and the opposite electrode 205 (a second electrode, a cathode).

The pixel electrode 201 may include a transparent conductive oxide such as indium tin oxide (ITO), indium zinc oxide (IZO), zinc oxide, indium oxide ($In_2O_3$), indium gallium oxide (IGO), and/or aluminum zinc oxide (AZO). The pixel electrode 201 may include a reflective layer including silver (Ag), magnesium (Mg), aluminum (Al), platinum (Pt), palladium (Pd), gold (Au), nickel (Ni), neodymium (Nd), iridium (Ir), chromium (Cr), and/or a compound thereof. For example, the pixel electrode 201 may have a triple structure of ITO/Ag/ITO.

The opposite electrode 205 may be arranged on the intermediate layer 203. The counter electrode 205 may include a metal having a low work function, an alloy, an electrically conductive compound, or any combination thereof. For example, the opposite electrode 205 may include lithium (Li), Ag, Mg, Al, aluminum-lithium (Al—Li), calcium (Ca), magnesium-indium (Mg—In), Mg—Ag, ytterbium (Yb), Ag—Yb, ITO, IZO, or any combination thereof. The opposite electrode 205 may be a transmissive electrode, a semi-transmissive electrode, or a reflective electrode.

The intermediate layer 203 may include a polymer or a low molecular weight organic material emitting light of a certain color. The intermediate layer 203 may further include, in addition to various organic materials, a metal-containing compound such as an organometallic compound, an inorganic material such as a quantum dot, and/or the like.

In an embodiment, the intermediate layer 203 may include one light-emitting layer and a first functional layer and a second functional layer under and on the light-emitting layer, respectively. The first functional layer may include, for example, a hole transport layer (HTL), or may include a HTL and a hole injection layer (HIL). The second functional layer that is an element arranged on the light-emitting layer, may be optional. The second functional layer may include an electron transport layer (ETL) and/or an electron injection layer (EIL).

In an embodiment, the intermediate layer 203 may include two or more emitting units sequentially stacked between the pixel electrode 201 and the opposite electrode 205, and a charge generation layer (CGL) arranged between two emitting units. In case that the intermediate layer 203 includes an emitting unit and a CGL, the organic light-emitting diode OLED may be a tandem light-emitting device. The organic light-emitting diode OLED may have a stack structure of multiple emitting units, thereby enhancing color purity and light-emitting efficiency.

An emitting unit may include a light-emitting layer, and a first functional layer and a second functional layer under and on the light-emitting layer, respectively. The CGL may include a negative CGL and a positive CGL. The light emitting efficiency of the organic light emitting diode OLED, which is a tandem light emitting device having a plurality of light emitting layers by the negative CGL and the positive CGL, may be further increased.

The negative CGL may be an n-type CGL. The negative CGL may supply electrons. The negative CGL may include a host and a dopant. The host may include an organic material. The dopant may include a metal material. The positive CGL may be a p-type CGL. The positive CGL may supply holes. The positive CGL may include a host and a dopant. The host may include an organic material. The dopant may include a metal material.

Figure 23A:
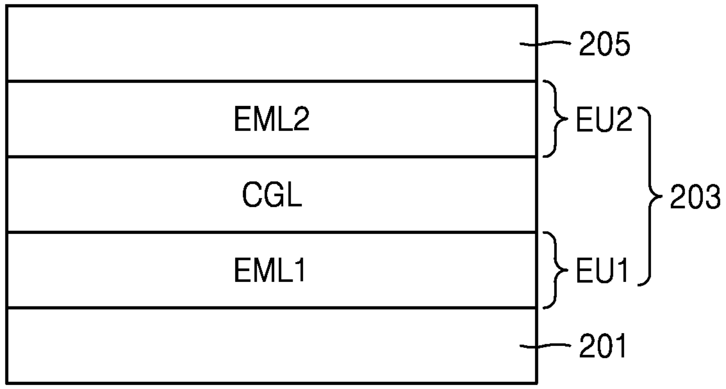
FIGS. 23A through 23D are schematic cross-sectional views illustrating the structure of a display element according to an embodiment.

In an embodiment, as shown in FIG. 23A, the organic light-emitting diode OLED may include a first emitting unit EU1 including a first emission layer EML1 and a second emitting unit EU2 including a second emission layer EML2, which are sequentially stacked. A CGL may be provided between the first emitting unit EU1 and the second emitting unit EU2. For example, the organic light-emitting diode OLED may include a pixel electrode 201, a first emission layer EML1, a CGL, a second emission layer EML2, and an opposite electrode 205, which are sequentially stacked on each other. A first functional layer and a second functional layer may be included under and on the first emission layer EML1, respectively. A first functional layer and a second functional layer may be included under and on the second emission layer EML2, respectively. The first emission layer EML1 may be a blue emission layer, and the second emission layer EML2 may be a yellow emission layer.

Figure 23B:
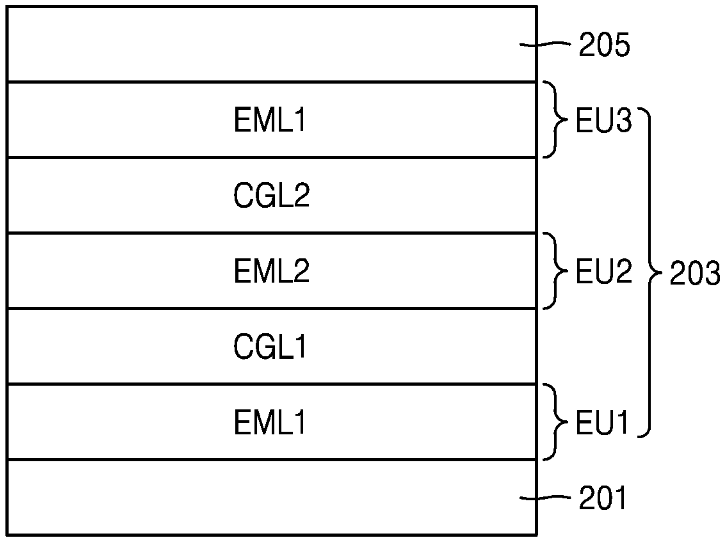

In an embodiment, as shown in FIG. 23B, an organic light-emitting diode OLED may include a first emitting unit EU1 and a third emitting unit EU3 including a first emission layer EML1, and a second emitting unit EU2 including a second emission layer EML2. A first CGL1 may be provided between the first emitting unit EU1 and the second emitting unit EU2, and a second CGL2 may be provided between the second emitting unit EU2 and the third emitting unit EU3. For example, the organic light-emitting diode OLED may include a pixel electrode 201, a first emission layer EML1, a first CGL1, a second emission layer EML2, a second CGL2, a first emission layer EML1, and an opposite electrode 205, which are sequentially stacked on each other. A first functional layer and a second functional layer may be included under and on the first emission layer EML1, respectively. A first functional layer and a second functional layer may be included under and on the second emission layer EML2, respectively. The first emission layer EML1 may be a blue emission layer, and the second emission layer EML2 may be a yellow emission layer.

In an embodiment, the organic light-emitting diode OLED may further include a third emission layer EML3 and/or a fourth emission layer EML4 which directly contact under and/or on the second emission layer EML2. Here, direct contact may mean that another layer is not present between the second emission layer EML2 and the third emission layer EML3 and/or between the second emission layer EML2 and the fourth emission layer EML4. The third emission layer EML3 may be a red emission layer, and the fourth emission layer EML4 may be a green emission layer.

Figure 23C:
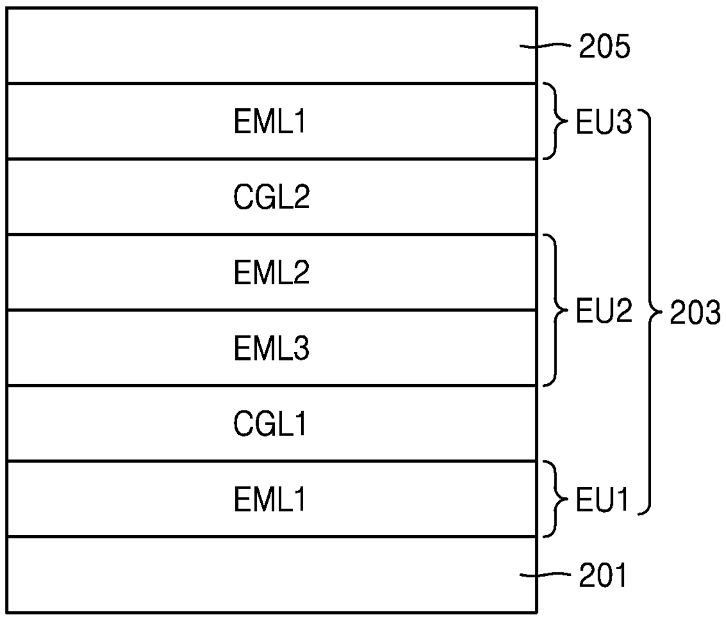

For example, as shown in FIG. 23C, an organic light-emitting diode OLED may include a pixel electrode 201, a first emission layer EML1, a first CGL CGL1, a third emission layer EML3, a second emission layer EML2, a second CGL CGL2, a first emission layer EML1, and an opposite electrode 205, which are sequentially stacked on each other. In another embodiment, as shown in FIG. 23D, an organic light-emitting diode OLED may include a pixel electrode 201, a first emission layer EML1, a first CGL CGL1, a third emission layer EML3, a second emission layer EML2, a fourth emission layer EML4, a second CGL CGL2, a first emission layer EML1, and an opposite electrode 205, which are sequentially stacked on each other.

Figure 23D:
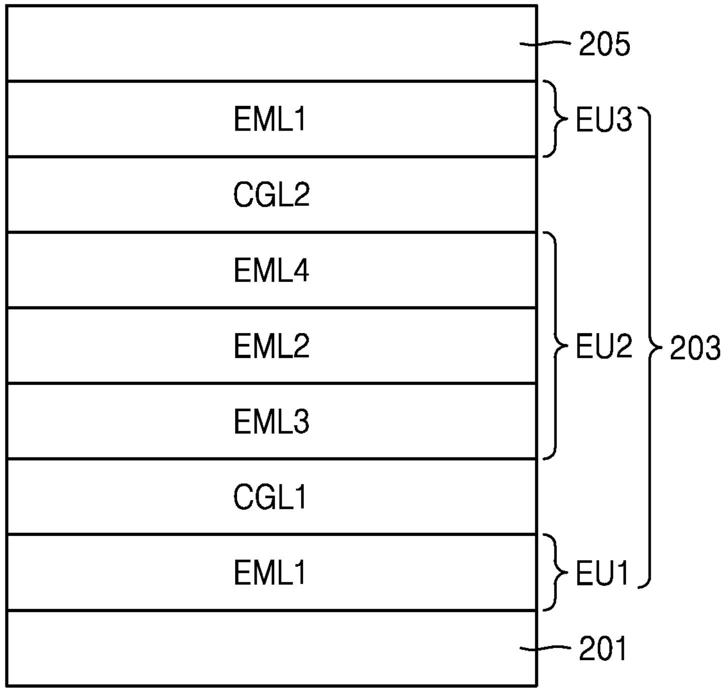
Figure 24A:
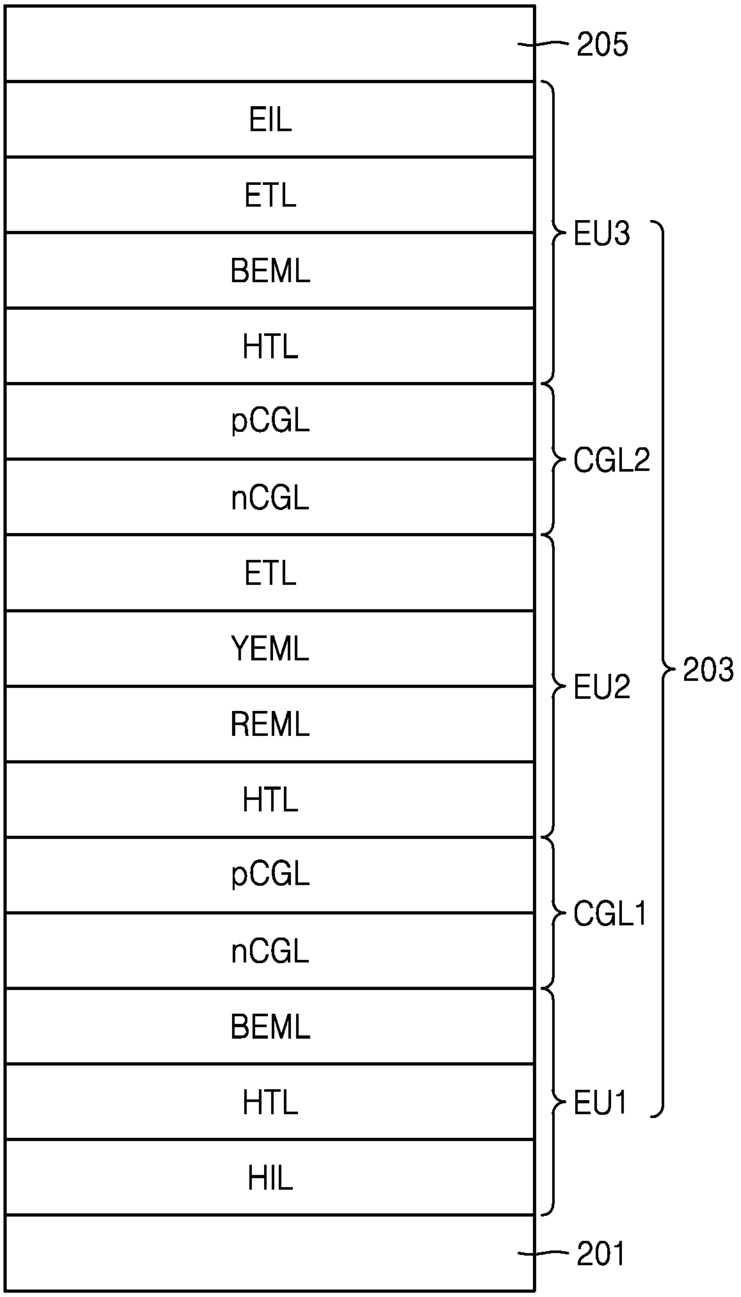
FIG. 24A is a schematic cross-sectional view illustrating an example of an organic light-emitting diode of FIG. 23C.
Figure 24B:
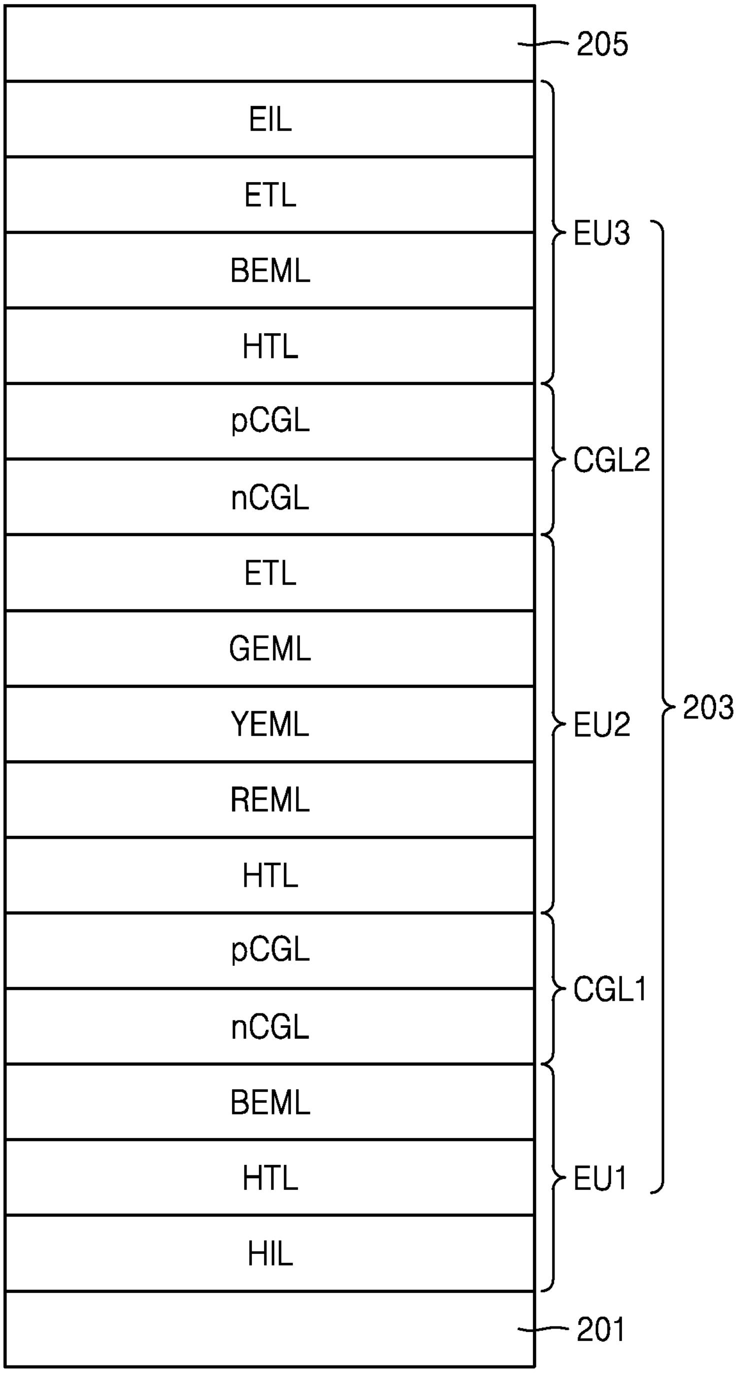
FIG. 24B is a schematic cross-sectional view illustrating an example of an organic light-emitting diode of FIG. 23D.

FIG. 24A is a schematic cross-sectional view illustrating an example of the organic light-emitting diode of FIG. 23C, and FIG. 24B is a schematic cross-sectional view illustrating an example of the organic light-emitting diode of FIG. 23D.

Referring to FIG. 24A, the organic light-emitting diode OLED may include a first emitting unit EU1, a second emitting unit EU2, and a third emitting unit EU3, which are sequentially stacked. A first CGL1 may be provided between the first emitting unit EU1 and the second emitting unit EU2, and a second CGL2 may be provided between the second emitting unit EU2 and the third emitting unit EU3. The first CGL CGL1 and the second CGL CGL2 may each include a negative CGL nCGL and a positive CGL pCGL.

The first emitting unit EU1 may include a blue emission layer BEML. The first emitting unit EU1 may further include a HIL and a HTL between the pixel electrode 201 and the blue emission layer BEML. In an embodiment, a p-doping layer may be further included between the HIL and the HTL. The p-doping layer may be formed by doping the HIL with a p-type doping material. In an embodiment, at least one of a blue light auxiliary layer, an electron blocking layer, and a buffer layer may be further included between the blue emission layer BEML and the HTL. The blue light auxiliary layer may increase light emission efficiency of the blue emission layer BEML. The blue light auxiliary layer may increase light emission efficiency of the blue emission layer BEML by adjusting a hole charge balance. The electron blocking layer may prevent electron injection to the HTL. The buffer layer may compensate for a resonance distance according to the wavelength of light emitted from the emission layer.

The second emitting unit EU2 may include a yellow emission layer YEML and a red emission layer REML under the yellow emission layer YEML and directly contacting the yellow emission layer YEML. The second emitting unit EU2 may further include a HTL between the positive CGL pCGL of the first CGL CGL1 and the red emission layer REML and an ETL between the yellow emission layer YEML and the negative CGL nCGL of the second CGL CGL2.

The third emitting unit EU3 may include a blue emission layer BEML. The third emitting unit EU3 may further include a HTL between the positive CGL pCGL of the second CGL CGL2 and the blue emission layer BEML. The third emitting unit EU3 may further include an ETL and an EIL between the blue emission layer BEML and the opposite electrode 205. The ETL may have a single layer or a multi-layer structure. In an embodiment, at least one of a blue light auxiliary layer, an electron blocking layer, and a buffer layer may be further included between the blue emission layer BEML and the HTL. At least one of a hole blocking layer and a buffer layer may be further included between the blue emission layer BEML and the ETL. The hole blocking layer may prevent hole injection to the ETL.

In the organic light-emitting diode OLED shown in FIG. 24B, the stack structure of the second emitting unit EU2 may be different from that of the organic light-emitting diode OLED shown in FIG. 24A, and other aspects may be the same.

Referring to FIG. 24B, the second emitting unit EU2 may include a yellow emission layer YEML, a red emission layer REML under the yellow emission layer YEML and directly contacting the yellow emission layer YEML, and a green emission layer GEML on the yellow emission layer YEML and directly contacting the yellow emission layer YEML. The second emitting unit EU2 may further include a HTL between the positive CGL pCGL of the first CGL CGL1 and the red emission layer REML and an ETL between the yellow emission layer YEML and the negative CGL nCGL of the second CGL CGL2.

Figure 25:
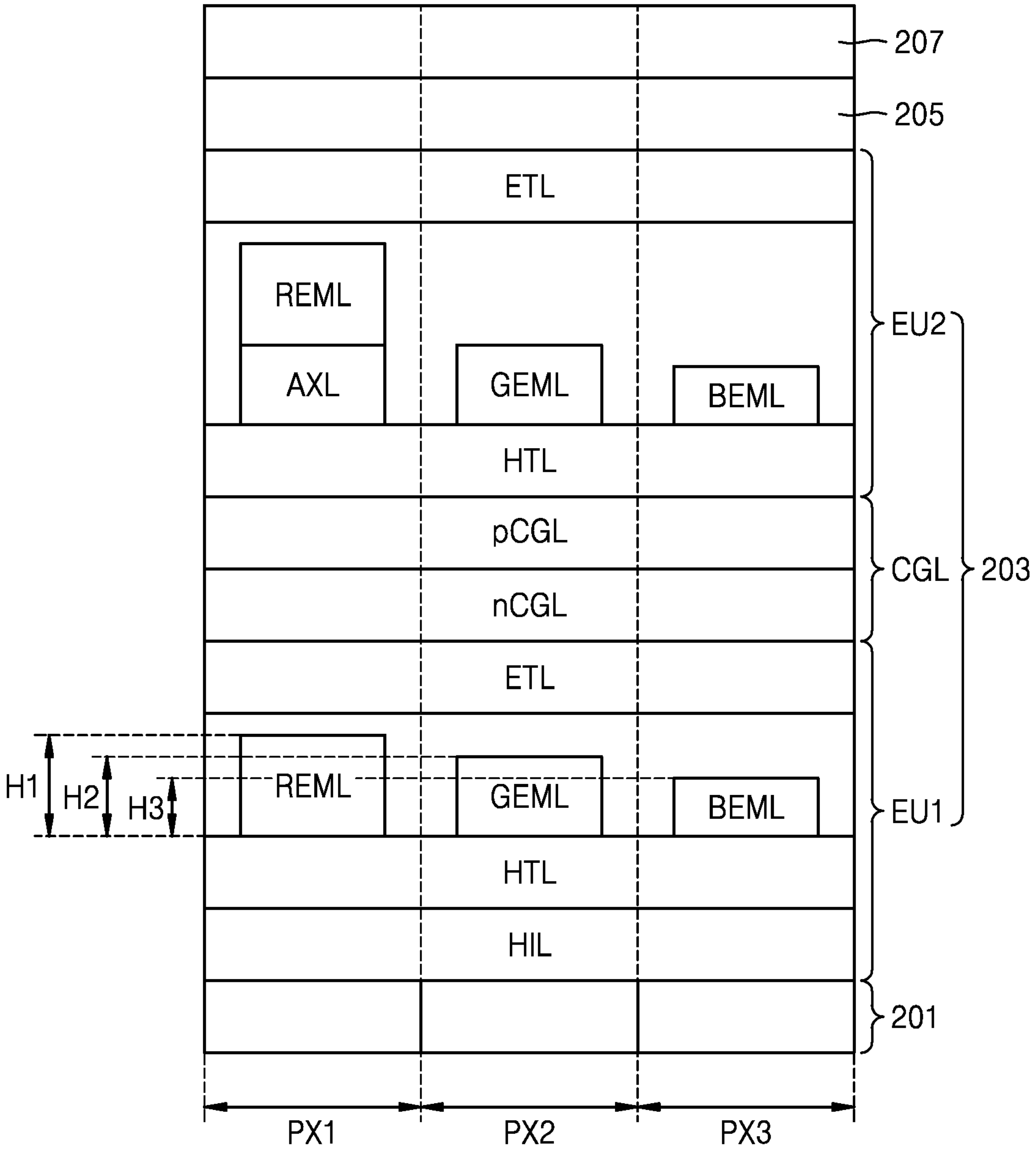
FIG. 25 is a schematic cross-sectional view illustrating the structure of a pixel of a display apparatus according to an embodiment.

FIG. 25 is a schematic cross-sectional view illustrating the structure of a pixel of a display apparatus according to an embodiment.

Referring to FIG. 25, the display apparatus may include multiple pixels. The pixels may include a first pixel PX1, a second pixel PX2, and a third pixel PX3. The first pixel PX1, the second pixel PX2, and the third pixel PX3 may include a pixel electrode 201, an opposite electrode 205, and an intermediate layer 203, respectively. In an embodiment, the first pixel PX1 may be a red pixel, the second pixel PX2 may be a green pixel, and the third pixel PX3 may be a blue pixel. Here, the pixel may include an organic light-emitting diode OLED as a display element, and the organic light-emitting diode OLED of each pixel may be electrically connected to the pixel circuit.

The pixel electrode 201 may be independently provided on each of the first pixel PX1, the second pixel PX2, and the third pixel PX3.

The intermediate layer 203 of the organic light-emitting diode OLED of each of the first pixel PX1, the second pixel PX2, and the third pixel PX3 may include a first emitting unit EU1 and a second emitting unit EU2, and a CGL between the first emitting unit EU1 and the second emitting unit EU2, which are sequentially stacked. The CGL may include a negative CGL and a positive CGL. The CGL may be a common layer formed consecutively on the first pixel PX1, the second pixel PX2, and the third pixel PX3.

The first emitting unit EU1 of the first pixel PX1 may include a HIL, a HTL, a red emission layer REML, and an ETL, which are sequentially stacked on the pixel electrode 201. The first emitting unit EU1 of the second pixel PX2 may include a HIL, a HTL, a green emission layer GEML, and an ETL, which are sequentially stacked on the pixel electrode 201. The first emitting unit EU1 of the third pixel PX3 may include a HIL, a HTL, a blue emission layer BEML, and an ETL, which are sequentially stacked on the pixel electrode 201. The HIL, the HTL, and the ETL of the first emitting units EU1 may be a common layer formed consecutively in the first pixel PX1, the second pixel PX2, and the third pixel PX3, respectively.

The second emitting unit EU2 of the first pixel PX1 may include a HTL, an auxiliary layer AXL, a red emission layer REML, and an ETL, which are sequentially stacked on the CGL. The second emitting unit EU2 of the second pixel PX2 may include a HTL, a green emission layer GEML, and an ETL, which are sequentially stacked on the CGL. The second emitting unit EU2 of the third pixel PX3 may include a HTL, a blue emission layer BEML, and an ETL, which are sequentially stacked on the CGL. The HTL and the ETL of the second emitting units EU2 may be a common layer formed consecutively in the first pixel PX1, the second pixel PX2, and the third pixel PX3, respectively. In an embodiment, at least one of a hole blocking layer and a buffer layer may be further included between the emission layer and the ETL in the second emitting unit EU2 of the first pixel PX1, the second pixel PX2, and the third pixel PX3.

A thickness H1 of the red emission layer REML, a thickness H2 of the green emission layer GEML, and a thickness H3 of the blue emission layer BEML may be determined according to a resonance distance. The auxiliary layer AXL that is a layer added to adjust the resonance distance may include a resonance auxiliary material. For example, the auxiliary layer AXL may include the same material as a material for forming the HTL.

In FIG. 25, the auxiliary layer AXL is provided only in the first pixel PX1. However, embodiments of the disclosure are not limited thereto. For example, the auxiliary layer AXL may be provided on at least one of the first pixel PX1, the second pixel PX2, and the third pixel PX3 so as to adjust a resonance distance of each of the first pixel PX1, the second pixel PX2, and the third pixel PX3.

The display apparatus may further include a capping layer 207 outside the opposite electrode 205. The capping layer 207 may serve to increase light emitting efficiency based on the principle of constructive interference. Thus, the optical extraction efficiency of the organic light-emitting diode OLED may be increased so that the light-emitting efficiency of the organic light-emitting diode OLED may be increased.

The aforementioned embodiments are described as an example of an organic light emitting display apparatus, but the display apparatus of the disclosure is not limited thereto. According to another embodiment of the disclosure, the display apparatus of the disclosure may be a display apparatus such as an inorganic light emitting display apparatus (an inorganic electroluminescent (EL) display apparatus) and/or a quantum dot light emitting display apparatus.

A display apparatus according to embodiments of the disclosure may be implemented as an electronic device, such as a smartphone, a mobile phone, a smart watch, a navigation device, a game machine, a television (TV), a head unit for a vehicle, a laptop computer, a tablet computer, a personal media player (PMP), and/or a personal digital assistant (PDA). Also, the electronic device may be a flexible device.

The display apparatus according to an embodiment of the disclosure may minimize an afterimage while being driven at multiple frequencies.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure.

What is claimed is:

1. A pixel comprising:

a light-emitting device;

a driving transistor electrically connected between a driving voltage line and the light-emitting device and that controls a driving current supplied to the light-emitting device;

a first switching transistor electrically connected between a data line and a first node to which a gate of the driving transistor is electrically connected;

a second switching transistor electrically connected between the driving voltage line and a second node to which a first terminal of the driving transistor is electrically connected;

a third switching transistor electrically connected between a third node to which a second terminal of the driving transistor is electrically connected and the light-emitting device; and a control transistor electrically connected between a gate of the second switching transistor or a gate of the third switching transistor and the second node, wherein the control transistor controls a bias state of the driving transistor in response to a voltage of a first gate signal for controlling turn-on of the second switching transistor and a voltage of a second gate signal for controlling turn-on of the third switching transistor.

2. The pixel of claim 1, wherein the control transistor is electrically connected between a gate of the second switching transistor and the second node and comprises a gate connected to the second node, and the control transistor controls the driving transistor in an on-bias state by supplying a first level voltage of the first gate signal to the second node while the first level voltage of the first gate signal for turning off the second switching transistor and the first level voltage of the second gate signal for turning off the third switching transistor overlap each other.

3. The pixel of claim 2, further comprising:

a first capacitor and a second capacitor serially connected between the first node and the driving voltage line;

a fourth switching transistor electrically connected between the third node and a fourth node;

a fifth switching transistor electrically connected between the fourth node and an initialization voltage line;

a sixth switching transistor electrically connected between the first node and the fourth node;

a seventh switching transistor electrically connected between a fifth node to which the first capacitor and the second capacitor are electrically connected, and the first switching transistor;

an eighth switching transistor electrically connected between a sixth node to which the first switching transistor and the eleventh switching transistor are electrically connected, and a reference voltage line; and a ninth switching transistor electrically connected between a pixel electrode of the light-emitting device and the initialization voltage line.

4. The pixel of claim 3, wherein, in case that a third gate signal applied to gates of the sixth switching transistor and the eleventh switching transistor is the first level voltage, the sixth switching transistor and the seventh switching transistor are turned on.

5. The pixel of claim 3, wherein a fourth gate signal is simultaneously applied to a gate of the first switching transistor and a gate of the ninth switching transistor, and in case that the fourth gate signal is a second level voltage, the first switching transistor and the ninth switching transistor are turned on.

6. The pixel of claim 1, wherein the control transistor is electrically connected between a gate of the third switching transistor and the second node and comprises a gate electrically connected to a gate of the second switching transistor, and in case that the first gate signal is a first level voltage, the second switching transistor is turned off, and the control transistor is turned on.

7. The pixel of claim 6, wherein the control transistor controls the driving transistor in an on-bias state by supplying a first level voltage of the second gate signal to the second node while a first level voltage of the first gate signal for turning off the second switching transistor and the first level voltage of the second gate signal for turning off the third switching transistor overlap each other.

8. The pixel of claim 6, wherein the control transistor controls the driving transistor in an off-bias state by supplying a second level voltage of the second gate signal to the second node while a first level voltage of the first gate signal for turning off the second switching transistor and the second level voltage of the second gate signal for turning on the third switching transistor overlap each other.

9. The pixel of claim 6, further comprising:

a first capacitor and a second capacitor serially connected between the first node and the driving voltage line;

a fourth switching transistor electrically connected between the third node and a fourth node;

a fifth switching transistor electrically connected between the fourth node and an initialization voltage line;

a sixth switching transistor electrically connected between the first node and the fourth node;

a seventh switching transistor electrically connected between a fifth node to which the first capacitor and the second capacitor are electrically connected, and the first switching transistor;

an eighth switching transistor electrically connected between a sixth node to which the first switching transistor and the eleventh switching transistor are electrically connected, and a reference voltage line; and a ninth switching transistor electrically connected between a pixel electrode of the light-emitting device and the initialization voltage line.

10. The pixel of claim 9, wherein, in case that the second gate signal is applied to gates of the sixth switching transistor and the seventh switching transistor and in case that the second gate signal is the first level voltage, the sixth switching transistor and the seventh switching transistor are turned on.

11. The pixel of claim 9, wherein, in case that a third gate signal is simultaneously applied to a gate of the first switching transistor and a gate of the ninth switching transistor and in case that the third gate signal is a second level voltage, the first switching transistor and the ninth switching transistor are turned on.

12. A display apparatus comprising:

a pixel unit comprising:

a first pixel arranged in a first row; and a second pixel arranged in a second row adjacent to the first row;

a gate driving circuit that supplies a gate signal to the first pixel and the second pixel; and a data driving circuit that supplies data signals to the first pixel and the second pixel, wherein each of the first pixel and the second pixel comprises:

a light-emitting device;

a driving transistor electrically connected between a driving voltage line and the light-emitting device and that controls a driving current supplied to the light-emitting device;

a first switching transistor electrically connected between a data line and a first node to which a gate of the driving transistor is electrically connected and comprising a gate electrically connected to a first gate line;

a third switching transistor electrically connected between a third node to which a second terminal of the driving transistor is electrically connected, and the light-emitting device and comprising a gate electrically connected to a third gate line, and the first pixel and the second pixel share:

the driving voltage line; and the third gate line;

a second switching transistor electrically connected between a second node to which a first terminal of a driving transistor of the first pixel and a first terminal of a driving transistor of the second pixel are electrically connected and the driving voltage line and comprising a gate electrically connected to a second gate line;

a control transistor electrically connected between the third gate line and the second node and comprising a gate electrically connected to the third gate line; and the second gate line, and the control transistor controls a bias state of the driving transistors of the first pixel and the second pixel according to a voltage level of a second gate signal supplied to the second gate line and a voltage level of a third gate signal supplied to the third gate line.

13. The display apparatus of claim 12, wherein the control transistor controls the driving transistor in an on-bias state by supplying a first level voltage of the second gate signal to the second node while a first level voltage of the second gate signal for turning off the second switching transistor and the first level voltage of the third gate signal for turning off the third switching transistor overlap each other.

14. The display apparatus of claim 12, wherein the control transistor controls the driving transistor in an off-bias state by supplying a second level voltage of the third gate signal to the second node while a first level voltage of the second gate signal for turning off the second switching transistor and the second level voltage of the third gate signal for turning on the third switching transistor overlap each other.

15. The display apparatus of claim 12, wherein each of the first pixel and the second pixel comprises:

a first capacitor and a second capacitor that are serially connected between the first node and a reference voltage line;

a fourth switching transistor electrically connected between the third node and a fourth node;

a fifth switching transistor electrically connected between the fourth node and an initialization voltage line;

a sixth switching transistor electrically connected between the first node and the fourth node;

a seventh switching transistor electrically connected between a fifth node to which the first capacitor and the second capacitor are electrically connected, and the first switching transistor;

an eighth switching transistor electrically connected between a sixth node to which the first switching transistor and the seventh switching transistor are electrically connected, and the reference voltage line; and a ninth switching transistor electrically connected between a pixel electrode of the light-emitting device and the initialization voltage line.

16. The display apparatus of claim 15, wherein the third gate signal is applied to gates of the sixth switching transistor and the seventh switching transistor, and in case that the third gate signal is the first level voltage, the sixth switching transistor and the seventh switching transistor are turned on.

17. The display apparatus of claim 15, wherein a first gate signal is simultaneously applied to a gate of the first switching transistor and a gate of the ninth switching transistor, and in case that the first gate signal is a second level voltage, the first switching transistor and the ninth switching transistor are turned on.

18. The display apparatus of claim 15, wherein the first pixel and the second pixel share:

a fourth gate line to which gates of the fourth switching transistor and the eighth switching transistor are electrically connected;

a fifth gate line to which a gate of the fifth switching transistor is electrically connected; and the initialization voltage line.

19. The display apparatus of claim 18, wherein the gate driving circuit comprises:

a first gate driving circuit that supplies the first gate signal of the second level voltage to the first gate line at a first driving frequency corresponding to a maximum driving frequency of the display apparatus; and a second gate driving circuit that supplies the fourth gate signal to the fourth gate line and the fifth gate signal to the fifth gate line at a second driving frequency corresponding to a refresh rate of the display apparatus.

20. The display apparatus of claim 12, wherein the gate driving circuit supplies the second gate signal to the second gate line and the third gate signal to the third gate line so that the bias state of the driving transistors is controlled at a first driving frequency corresponding to a maximum driving frequency of the display apparatus.

* * * * *